United States Patent
Hwang et al.

(10) Patent No.: US 9,948,963 B2
(45) Date of Patent: Apr. 17, 2018

(54) SIGNAL TRANSCEIVING APPARATUS AND SIGNAL TRANSCEIVING METHOD

(71) Applicant: LG ELECTRONICS INC., Seoul (KR)

(72) Inventors: Soojin Hwang, Seoul (KR); Jongyeul Suh, Seoul (KR)

(73) Assignee: LG ELECTRONICS INC., Seoul (KR)

(*) Notice: Subject to any disclaimer, the term of this patent is extended or adjusted under 35 U.S.C. 154(b) by 17 days.

(21) Appl. No.: 14/439,180

(22) PCT Filed: Nov. 26, 2013

(86) PCT No.: PCT/KR2013/010772
§ 371 (c)(1),
(2) Date: Apr. 28, 2015

(87) PCT Pub. No.: WO2014/084564
PCT Pub. Date: Jun. 5, 2014

(65) Prior Publication Data
US 2015/0296232 A1    Oct. 15, 2015

Related U.S. Application Data

(60) Provisional application No. 61/730,464, filed on Nov. 27, 2012.

(51) Int. Cl.
*H04N 7/12* (2006.01)
*H04N 11/02* (2006.01)
(Continued)

(52) U.S. Cl.
CPC ..... *H04N 21/23614* (2013.01); *H04N 19/117* (2014.11); *H04N 19/187* (2014.11);
(Continued)

(58) Field of Classification Search
CPC .................................................. H04N 19/34
See application file for complete search history.

(56) References Cited

U.S. PATENT DOCUMENTS

| 5,956,470 A | 9/1999 | Eschbach |
| 2009/0087111 A1 | 4/2009 | Noda et al. |

(Continued)

FOREIGN PATENT DOCUMENTS

| CN | 101828402 A | 9/2010 |
| CN | 102256132 A | 11/2011 |

(Continued)

OTHER PUBLICATIONS

ITU-T, "Advanced video coding for generic audiovisual services," Series H: Audiovisual and Multimedia Systems, Infrastructure of audiovisual services—Coding of moving Video, Recommendation ITU-T H.264, Mar. 2010, pp. 564-567 (676 pages).

(Continued)

*Primary Examiner* — Rebecca Volentine
(74) *Attorney, Agent, or Firm* — Birch, Stewart, Kolasch & Birch, LLP

(57) ABSTRACT

The present invention relates to a method and an apparatus for transceiving a signal, the method being compatible with an existing HD-based 8-bit bit depth mode while supporting a UHD-based 10-bit bit depth mode, and comprising: multiplexing or inverse-multiplexing video data which can be displayed within the color gamut of any one bit depth from among a plurality of bit depths, and signaling information regarding the display so that the display is within the color gamut of any one bit depth from among the plurality of bit depths; and processing the multiplexed or inverse-multiplexed video data and signaling information.

8 Claims, 22 Drawing Sheets

(51) Int. Cl.
*H04N 11/04* (2006.01)
*H04N 21/236* (2011.01)
*H04N 21/2343* (2011.01)
*H04N 21/81* (2011.01)
*H04N 21/434* (2011.01)
*H04N 19/34* (2014.01)
*H04N 19/70* (2014.01)
*H04N 19/46* (2014.01)
*H04N 19/117* (2014.01)
*H04N 19/187* (2014.01)

(52) U.S. Cl.
CPC ............ *H04N 19/34* (2014.11); *H04N 19/46* (2014.11); *H04N 19/70* (2014.11); *H04N 21/234327* (2013.01); *H04N 21/4348* (2013.01); *H04N 21/816* (2013.01)

(56) References Cited

U.S. PATENT DOCUMENTS

| | | | |
|---|---|---|---|
| 2009/0110054 A1* | 4/2009 | Kim | H04N 19/647 375/240.1 |
| 2009/0219994 A1* | 9/2009 | Tu | H04N 19/186 375/240.08 |
| 2009/0238279 A1* | 9/2009 | Tu | H04N 19/30 375/240.16 |
| 2010/0020866 A1* | 1/2010 | Marpe | H04N 19/00569 375/240.02 |
| 2010/0046612 A1* | 2/2010 | Sun | H04N 19/149 375/240.02 |
| 2010/0111167 A1 | 5/2010 | Wu et al. | |
| 2010/0135393 A1* | 6/2010 | Ying Gao | H04N 19/00315 375/240.15 |
| 2010/0166067 A1 | 7/2010 | Park et al. | |
| 2010/0220796 A1* | 9/2010 | Yin | H04N 19/159 375/240.29 |
| 2010/0226427 A1 | 9/2010 | Jung et al. | |
| 2011/0280302 A1 | 11/2011 | Alshina et al. | |
| 2012/0314026 A1* | 12/2012 | Chen | H04N 19/159 348/43 |
| 2012/0314965 A1 | 12/2012 | Kashiwagi et al. | |
| 2013/0177066 A1* | 7/2013 | Ye | H04N 19/36 375/240.02 |
| 2013/0314495 A1* | 11/2013 | Chen | H04N 13/0048 348/43 |
| 2014/0003527 A1* | 1/2014 | Tourapis | H04N 19/00424 375/240.16 |
| 2014/0105289 A1* | 4/2014 | Su | H04N 19/00424 375/240.12 |
| 2014/0348232 A1* | 11/2014 | Leontaris | H04N 19/597 375/240.12 |
| 2015/0326865 A1* | 11/2015 | Yin | H04N 19/46 375/240.13 |

FOREIGN PATENT DOCUMENTS

| | | |
|---|---|---|
| EP | 0 981 127 A1 | 2/2000 |
| EP | 1871113 A1 | 12/2007 |
| EP | 2062747 B1 | 8/2015 |
| JP | 11-154226 A | 6/1999 |
| JP | 2002-281463 A | 9/2002 |
| JP | 2012-519451 A | 8/2012 |
| KR | 10-2009-0098825 A | 9/2009 |
| KR | 10-2011-0013577 A | 2/2011 |
| KR | 10-2011-0126032 A | 11/2011 |
| RU | 2433562 C2 | 11/2011 |
| WO | WO 2008/071036 A1 | 6/2008 |
| WO | WO 2012/086203 A1 | 6/2012 |

OTHER PUBLICATIONS

Gao et al., "Applications and Requirement for Color Bit Depth Scalability," Joint Video Team (JVT) of ISO/IEC MPEG & ITU-T VCEG (ISO/IEC JTC1/SC29/WG11 and ITU-T SG16 Q.6), JVT-U049, 21st Meeting, Hangzhou, China, XP002476743, Oct. 20-27, 2006, pp. 1-10.

* cited by examiner

FIG. 11

| Syntax | No. of bits | Mnemonic |
|---|---|---|
| TS_program_map_section ( ) { | | |
|     table_id | 8 | uimsbf |
|     section_syntax_indicator | 1 | bslbf |
|     '0' | 1 | bslbf |
|     reserved | 2 | bslbf |
|     section_length | 12 | uimsbf |
|     program_number | 16 | uimsbf |
|     reserved | 2 | bslbf |
|     version_number | 5 | uimsbf |
|     current_next_indicator | 1 | bslbf |
|     section_number | 8 | uimsbf |
|     last_section_number | 8 | uimsbf |
|     reserved | 3 | bslbf |
|     PCR_PID | 13 | uimsbf |
|     reserved | 4 | bslbf |
|     program_info_length | 12 | uimsbf |
|     for (i=0; i< N; i++) { | | |
|         descriptor( ) | | |
|     } | | |
|     for (i=0; i< N1; i++) { | | |
|         stream_type | 8 | uimsbf |
|         reserved | 3 | bslbf |
|         elementary_PID | 13 | uimsbf |
|         reserved | 4 | bslbf |
|         ES_info_length | 12 | uimsbf |
|         for (i=0; i< N2; i++) { | | |
|             descriptor( ) | | |
|         } | | |
|     } | | |
|     CRC_32 | 32 | rpchof |
| } | | |

UHD COMPOSITION DESCRIPTOR LOCATION – INFORMATION ON ENHANCEMENT LAYER 2 VIDEO ELEMENT (DESCRIPTOR FOR BASE LAYER VIDEO ELEMENT AND ENHANCEMENT LAYER 1 VIDEO ELEMENT)

| Syntax | No. of bits | Format |
|---|---|---|
| UHD_program_type_descriptor | | |
|     descriptor_tag | 8 | uimsbf |
|     descriptor_length | 8 | uimsbf |
|     UHD_program_format_type | 8 | uimsbf |
| } | | |

0x05 – SERVICE BIT DEPTH SIGNAL FOR 8-BIT BIT-DEPTH HD COMPATIBILITY, 8-BIT BIT DEPTH UHD COMPATIBILITY, 10-BIT BIT DEPTH UHD VIDEO COMPOSITION AS SEPARATE LAYER

FIG. 12

| Syntax | Description |
|---|---|
| Program map section ( ) {<br>  .<br>  .<br>  .<br>  stream_type<br>  elementary_PID<br>  descriptor ( ) | 0 x 02 ( MPEG-2 VIDEO CODEC )<br>0 x 019A<br>MPEG-2 VIDEO RELATED DESCRIPTOR |
|   stream_type<br>  elementary_PID<br><br>  UHDTV_sub_stream_descriptor ( ) | 0 x A1 ( HEVC SCALABLE LAYER VIDEO CODEC )<br>0 x 109B<br><br>INFORMATION NECESSARY TO COMPOSE UHD VIDEO OF BIT DEPTH USING INFORMATION RELATED TO EL1 AND BASE LAYER |
|   stream_type<br>  elementary_PID<br>  UHD_compositon_descriptor ( )<br>  .<br>  .<br>  .<br>} | 0 x A2 ( HEVC VIDEO CODEC )<br>0 x 109C<br>INFORMATION FOR RESTORING UHD VIDEO COMPOSED WITH 10-BIT BIT DEPTH AND INFORMATION RELATED TO EL2 |

FIG. 13

| Syntax | No. of bits | Format |
|---|---|---|
| UHD_composition_descriptor ( ) { | | |
|     descriptor_tag | 8 | uimsbf |
|     descriptor_length | 5 | uimsbf |
|     UHD_composition_metadata ( ) | | |
| } | | |

| Syntax | No. of bits | Format |
|---|---|---|
| UHD_composition_metadata ( ) { | | |
|     EL2_video_codec_type | 8 | uimsbf |
|     EL2_video_profile | 5 | uimsbf |
|     EL2_video_level | 8 | uimsbf |
|     EL2_video_tier_flag | 1 | bslbf |
|     reserved | 2 | bslbf |
|     EL2_video_component_type | 2 | uimsbf |
|     EL2_video_scaling_type | 1 | blsbf |
|     reserved | 1 | blsbf |
|     original_UHD_video_type | 4 | uimsbf |
|     original_UHD_video_bit_depth_type | 2 | uimsbf |
|     EL2_video_diff_bit_depth | 2 | uimsbf |
|     num_of_intervals | 4 | uimsbf |
|     for (i= 0; i<enhancement_video_filter_num; i++) { | | |
|         interval_start | 16 | uimsbf |
|         interval_end | 16 | uimsbf |
|         EL2_bit_depth_scaling_type | 8 | uimsbf |
|         EL2_bit_depth_scaling_info ( ) | | uimsbf |
|     } | | |
|     bit_depth_upscale_filter ( ) | | |
|     reserved | 1 | blsbf |
| } | | |

FIG. 14

| EL2_video_scaling_type | Description |
|---|---|
| 0 | Bit-depth down-scaling |
| 1 | Bit-depth up-scaling |

FIG. 15

| UHD_video_type | Description |
|---|---|
| 0000 ~ 0010 | reserved |
| 0011 | 3840 x 2160, 60p |
| 0100 | 3840 x 2160, 120p |
| 0101 | 4096 x 2160, 60p |
| 0110 | 4096 x 2160, 120p |
| 0111 | 7680 x 4320, 60p |
| 1000 | 7680 x 4320, 120p |
| 1001 | 8192 x 4320, 60p |
| 1010 | 8192 x 4320, 120p |
| 1011 - 1111 | reserved |

FIG. 16

| original_UHD_video_bit_depth_type | Description |
|---|---|
| 00 | 8bit |
| 01 | 10bit |
| 10 | 12bit |
| 11 | reserved |

FIG. 17

| EL2_video_diff_bit_depth | Description |
|---|---|
| 00 | 2bit |
| 01 | 4bit |
| 10 | 6bit |
| 11 | reserved |

FIG. 18

| EL2_bit_depth_scaling_type | Description |
|---|---|
| 0x00 | Linear function |
| 0x01 | Logarithmic function |
| 0x02 | Exponential function |
| 0x03 | Look-up table |
| 0x04 ~ 0xFF | Reserved |

FIG. 19

| Syntax | No. of bits | Format |
|---|---|---|
| EL2_bit_depth_scaling_info ( ) { | | |
|     if (EL2_bit_depth_scaling_type=='0x00') { | | |
|         y_intercept | 8 | uimsbf |
|         gradient | 8 | uimsbf |
|     } | | |
|     else if (EL2_video_scaling_type=='1' && EL2_bit_depth_scaling_type=='0x01') { | | |
|         base | 8 | uimsbf |
|         offset | 8 | uimsbf |
|         coeff_m | 8 | |
|         coeff_a | 8 | uimsbf |
|     } | | |
|     else if (EL2_video_scaling_type=='1' && EL2_bit_depth_scaling_type=='0x02') { | | |
|         offset | 8 | uimsbf |
|         coeff_m | 8 | |
|         coeff_a | 8 | uimsbf |
|     } | | |
|     else if (EL2_video_scaling_type=='1' && EL2_bit_depth_scaling_type=='0x03') { | | |
|         entry_length | 8 | uimsbf |
|         for (i=0; i<entry_length; i++) { | | |
|             in_value | 8 | uimsbf |
|             out_value | 10 | uimsbf |
|         } | | |
|     } | | |
| } | | |

EMBODIMENT OF SCALING FROM 8 BITS TO 10 BITS

| Syntax | Number of bits | Mnemonics |
|---|---|---|
| bit_depth_scaling_section ( ) { | | |
| table_id | 8 | uimsbf |
| section_syntax_indicator | 1 | '0' |
| private_indicator | 1 | bslbf |
| reserved | 2 | bslbf |
| private_section_length | 12 | uimsbf |
| scaling_id | 8 | uimsbf |
| scaling_version_num | 8 | uimsbf |
| entry_length | 8 | uimsbf |
| for ( i = 0; i < entry_length; i++ ) { | | |
| in_value | 8 | |
| out_value | 8 | uimsbf |
| } | | |
| } | | |

FIG. 22

| Syntax | No. of bits | Mnemonic |
|---|---|---|
| service_description_section ( ) { | | |
|   table_id | 8 | uimsbf |
|   section_syntax_indicator | 1 | bslbf |
|   reserved_future_use | 1 | bslbf |
|   reserved | 2 | bslbf |
|   section_length | 12 | uimsbf |
|   transport_stream_id | 16 | uimsbf |
|   reserved | 2 | bslbf |
|   version_number | 5 | uimsbf |
|   current_next_indicator | 1 | bslbf |
|   section_number | 8 | uimsbf |
|   last_section_number | 8 | uimsbf |
|   original_network_id | 16 | uimsbf |
|   reserved_future_use | 8 | bslbf |
|   for (i=0; i< N; i++) { | | |
|     service_id | 16 | uimsbf |
|     reserved_future_use | 6 | bslbf |
|     EIT_schedule_flag | 1 | bslbf |
|     EIT_present_following_flag | 1 | bslbf |
|     running_status | 3 | uimsbf |
|     free_CA_mode | 1 | bslbf |
|     descriptors_loop_length | 12 | uimsbf |
|     for (j=0; j<N; j++) { | | |
|       descriptor() | | |
|     } | | |
|   } | | |
|   CRC_32 | 32 | rpchof |
| } | | | descriptor() → UHD_program_descriptor() + UHD_composition_descriptor
(AT THIS TIME, component_tag FIELD IS ADDED)

FIG. 23

| Syntax | No. of bits | Mnemonic |
|---|---|---|
| event_information_section ( ) { | | |
|   table_id | 8 | uimsbf |
|   section_syntax_indicator | 1 | bslbf |
|   reserved_future_use | 1 | bslbf |
|   reserved | 2 | bslbf |
|   section_length | 12 | uimsbf |
|   service_id | 16 | uimsbf |
|   reserved | 2 | bslbf |
|   version_number | 5 | uimsbf |
|   current_next_indicator | 1 | bslbf |
|   section_number | 8 | uimsbf |
|   last_section_number | 8 | uimsbf |
|   transport_stream_id | 16 | uimsbf |
|   original_network_id | 16 | uimsbf |
|   segment_last_section_number | 8 | uimsbf |
|   last_table_id | 8 | uimsbf |
|   for (i=0; i<N; i++) { | | |
|     event_id | 16 | uimsbf |
|     start_time | 40 | bslbf |
|     duration | 24 | uimsbf |
|     running_status | 3 | uimsbf |
|     free_CA_mode | 1 | bslbf |
|     descriptors_loop_length | 12 | uimsbf |
|     for (i=0; i<N; i++) { | | |
|       descriptor() | | |
|     } | | |
|   } | | |
|   CRC_32 | 32 | rpchof |
| } | | |

→ UHD_program_descriptor() +
UHD_composition_descriptor
(AT THIS TIME, component_tag FIELD IS ADDED)

FIG. 24

| Syntax | No. of bits | Format |
|---|---|---|
| terrestrial_virtual_channel_table_section ( ) { | | |
|   table_id | 8 | 0xC8 |
|   section_syntax_indicator | 1 | '1' |
|   private_indicator | 1 | '1' |
|   reserved | 2 | '11' |
|   section_length | 12 | uimsbf |
|   transport_stream_id | 16 | uimsbf |
|   reserved | 2 | '11' |
|   version_number | 5 | uimsbf |
|   current_next_indicator | 1 | bslbf |
|   section_number | 8 | uimsbf |
|   last_section_number | 8 | uimsbf |
|   protocol_version | 8 | uimsbf |
|   num_channel_in_section | 8 | uimsbf |
|   for (i=0; i< num_channel_in_section; i++) { | | |
|     short_name | 7*16 | uimsbf |
|     reserved | 4 | '1111' |
|     major_channel_number | 10 | uimsbf |
|     minor_channel_number | 10 | uimsbf |
|     modulation_mode | 8 | uimsbf |
|     carrier_frequency | 32 | uimsbf |
|     channel_TSID | 16 | uimsbf |
|     program_number | 16 | uimsbf |
|     ETM_location | 2 | uimsbf |
|     access_controlled | 1 | bslbf |
|     hidden | 1 | bslbf |
|     reserved | 2 | '11' |
|     hid_guide | 1 | bslbf |
|     reserved | 3 | '111' |
|     service_type | 6 | uimsbf |
|     source_id | 16 | uimsbf |
|     reserved | 6 | '111111' |
|     descriptors_length | 10 | uimsbf |
|     for (i=0; i<N; i++) { | | |
|       descriptor() | | |
|     } | | |
|   } | | |
| } | | | service_type → MAY BE SPECIFIED AS PARAMETERIZED SERVICE (0x07), EXTENDED PARAMETERIZED SERVICE (0x09) OR NEW DTV SERVICE SCALABLE UHDTV (0x10)

descriptor() → UHD_program_type_descriptor + UHD_composition_descriptor

FIG. 25

| sei_payload( payloadType, payloadSize ) { | Category | Descriptor |
|---|---|---|
| if (payloadType == 52 ) | | |
| UHDTV_scalable_bit_depth_service_info( payloadSize ) | 5 | |

| UHDTV_scalable_bit_depth_service_info(payloadSize ) { | C | Descriptor |
|---|---|---|
| UHD_program_format_type | 5 | u(8) |
| if(UHD_program_format_type == '0x05' { | | |
| UHD_composition_metadata | | |
| } | | |
| } | | |

SIGNAL TRANSCEIVING APPARATUS AND SIGNAL TRANSCEIVING METHOD

CROSS REFERENCE TO RELATED APPLICATIONS

This application is the National Phase of PCT International Application No. PCT/KR2013/010772, filed on Nov. 26, 2013, which claims priority under 35 U.S.C. 119(e) to U.S. Provisional Application No. 61/730,464, filed on Nov. 27, 2012, all of which are hereby expressly incorporated by reference into the present application.

TECHNICAL FIELD

The present invention relates to an apparatus and method for transmitting and receiving a signal.

BACKGROUND ART

As a video signal processing speed has increased, a method of encoding/decoding ultra high definition (UHD) video has been studied. A method of processing UHD video as well as HD video without any problems even when UHD video is received using an existing HD receiver has been studied.

A UHDTV needs to provide a screen having an improved frame rate, bit depth, color sampling format, etc. as compared to an existing HDTV, in order to provide a high-quality image. Among the others, when a bit depth increases from 8 bits to 10 bits, a luma value corresponding to Y of YcbCr composing one pixel value is changed from a value of 0 to 255 to a value of 0 to 1023, thereby increasing an express range and providing a higher-quality image. For a color gamut, two methods, that is, non-constant and constant luminance color encoding methods may be provided. In order to use the constant luminance color encoding method using wide color gamut, a bit depth needs to be extended to 10 bits.

However, since an existing HD receiver supporting an 8-bit bit depth cannot display video with a 10-bit bit depth, there is a need for a method of supporting a 10-bit bit depth while being compatible with an 8-bit bit depth, but a solution thereto has not been provided. In addition, there is a need for a method of signaling video data having different bit depths but a solution thereto has not been provided.

DISCLOSURE

Technical Problem

An object of the present invention devised to solve the problem lies in an apparatus and method for transmitting and receiving a signal, which is capable of displaying video having different bit depths according to performance of a receiver.

Another object of the present invention is to provide an apparatus and method for transmitting and receiving a signal, which are capable of transmitting signaling information enabling video having different bit depths to be displayed according to performance of a receiver.

Technical Solution

The object of the present invention can be achieved by providing a signal transmission method including encoding video data capable of being displayed in a color gamut of any one of a plurality of bit depths, generating signaling information such that the encoded video data is displayed in the color gamut of any one of the plurality of bit depths, and multiplexing the encoded video data and the signaling information and transmitting the multiplexed video data and signaling information.

The encoded video data may include UHD video data in a color gamut of an 8-bit bit depth and residual data which is a difference between UHD video data in a color gamut of a 10-bit bit depth and the UHD video data in the color gamut of the 8-bit bit depth.

The UHD video data in the color gamut of the 8-bit bit depth may include HD video data in a color gamut of an 8-bit bit depth and residual data which is a difference between the UHD video data in the color gamut of the 8-bit bit depth and the HD video data in the color gamut of the 8-bit bit depth.

The signaling information may include information on a scaling method of a bit depth such that the encoded video data is displayed in the color gamut of any one of the plurality of bit depths.

In another aspect of the present invention, provided herein is a signal reception method including demultiplexing video streams carrying video data capable of being displayed in a color gamut of any one of a plurality of bit depths and signaling information enabling the video streams to be displayed in the color gamut of any one of the plurality of bit depths; decoding the demultiplexed signaling information; and decoding the video data carried in at least one of the video streams based on metadata indicating a composition of the video data.

In another aspect of the present invention, provided herein is a signal transmission apparatus including an encoder configured to encode video data capable of being displayed in a color gamut of any one of a plurality of bit depths; a signaling information generator configured to generate signaling information such that the encoded video data is displayed in the color gamut of any one of the plurality of bit depths; and a multiplexer configured to multiplex the encoded video data and the signaling information.

In another aspect of the present invention, provided herein is a signal reception apparatus including a demultiplexer configured to demultiplex video streams carrying video data capable of being displayed in a color gamut of any one of a plurality of bit depths and signaling information enabling the video streams to be displayed in the color gamut of any one of the plurality of bit depths; a decoder configured to decode the demultiplexed signaling information; and a video decoder configured to decode the video data carried in at least one of the video streams based on metadata indicating a composition of the video data.

Advantageous Effects

According to embodiments of the present invention, it is possible to display video having different bit depths according to performance of a receiver.

According to embodiments of the present invention, it is possible to transmit signaling information enabling video having different bit depths to be displayed according to performance of a receiver.

DESCRIPTION OF DRAWINGS

FIG. 11 is a diagram showing signaling information enabling display of video according to an embodiment of the present invention.

FIG. 12 is a diagram showing the detailed syntax values of signaling information according to an embodiment of the present invention.

FIG. 13 is a diagram showing an example of a stream level descriptor according to an embodiment of the present invention.

FIG. 14 is a diagram showing scaling information of metadata.

FIG. 15 is a diagram showing original video information of metadata.

FIG. 16 is a diagram showing information on a bit depth type of original video of metadata.

FIG. 17 is a diagram showing information indicating a difference in bit depth between original video of metadata and transmitted video.

FIG. 18 is a diagram showing information indicating the type of bit scaling of metadata.

FIG. 19 is a diagram showing additional information on a scaling method of a bit depth of metadata.

FIG. 22 is a diagram showing the case in which the above-described descriptors are included in other signaling information.

FIG. 23 is a diagram showing the case in which the above-described descriptors are included in other signaling information.

FIG. 24 is a diagram showing the case in which the above-described descriptors are included in other signaling information.

FIG. 25 is a diagram showing the syntax of payload of an SEI area of video data according to embodiments of the present invention.

BEST MODE

Hereinafter, the embodiments of the present invention will be described with reference to the accompanying drawings. Hereinafter, N-bit video indicates video in a color gamut of a bit depth of N bits.

Figure 1:
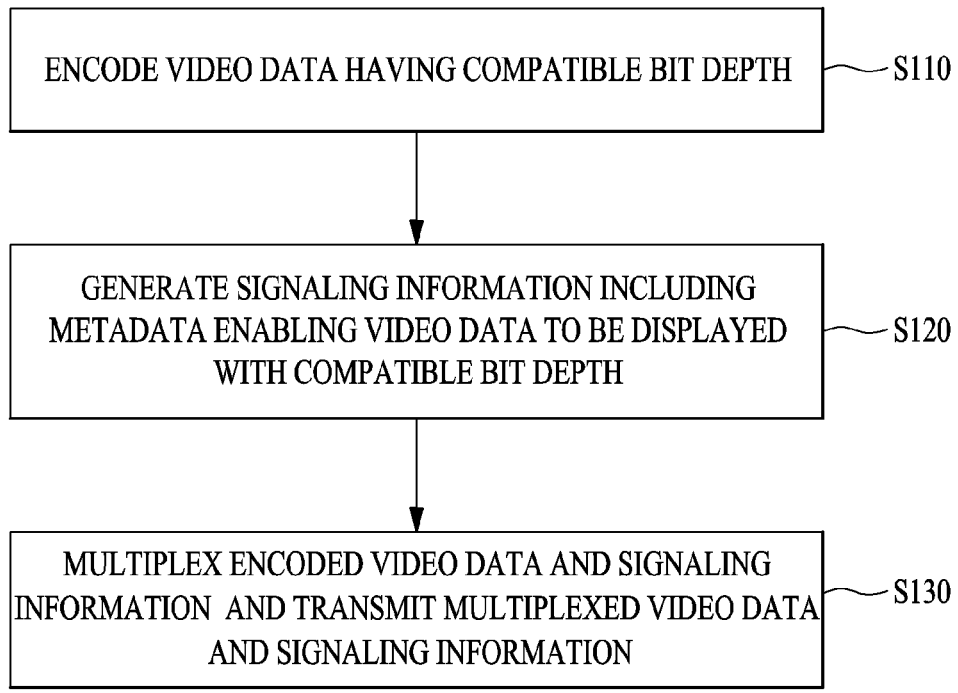
FIG. 1 is a diagram showing an embodiment of a method of transmitting a signal according to the present invention.

FIG. 1 is a diagram showing an embodiment of a method of transmitting a signal according to the present invention.

Video data having a compatible bit depth is encoded (S110). The compatible bit depth means that encoded video data can be displayed in a color gamut of any one of a plurality of bit depths.

Figure 7:
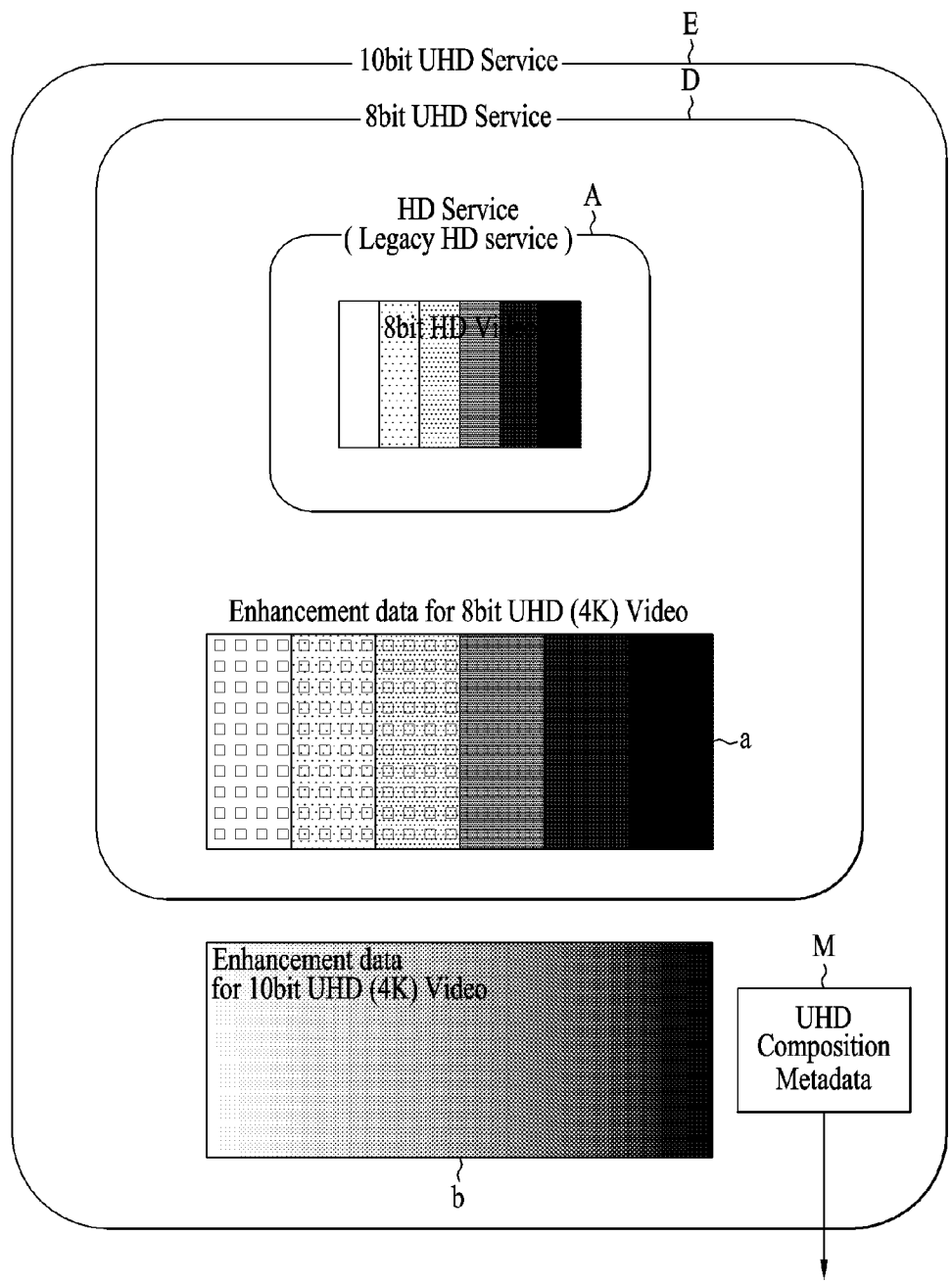
FIG. 7 is a diagram showing the structure of a video stream capable of displaying HD video in a color gamut of 8 bits and UHD video in a color gamut of 10 bits according to performance of a receiver.

The video data having the compatible bit depth and the structure of a stream carrying the video data are shown in FIG. 7. The stream of the video data having the compatible bit depth may include metadata indicating the composition of the video data. Here, the metadata is shown in FIG. 25. The metadata may enable encoded video data to be displayed in a color gamut of any one of a plurality of bit depths.

When the encoded video data is transmitted in a state of being included in a broadcast signal, signaling information including metadata enabling the video data to be displayed with the compatible bit depth is generated (S120). The signaling information is shown in FIGS. 11 to 24.

The encoded video data and the signaling information are multiplexed and the multiplexed video data and signaling information are transmitted (S130). When the encoded video data is not included in the broadcast signal, the signaling information is not multiplexed and a video data stream including metadata is transmitted.

Figure 2:
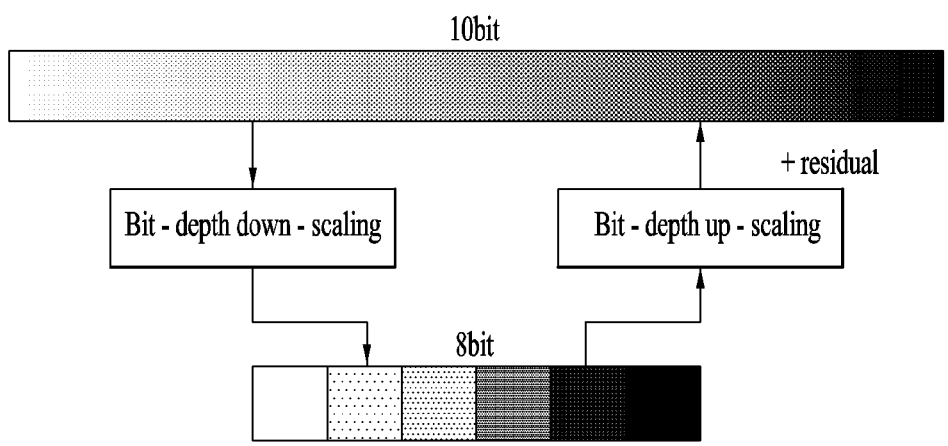
FIG. 2 is a diagram showing an example of scaling a bit depth expressing the color of video.

FIG. 2 is a diagram showing an example of scaling a bit depth expressing the color of video. For example, the color of video may be downscaled from a color gamut of a 10-bit bit depth to a color gamut of an 8-bit bit depth or may be upscaled from a color gamut of an 8-bit bit depth to a color gamut of a 10-bit bit depth. Upon upscaling, a residual value may be used.

The method of scaling the bit depth may be divided into two methods: a method of using a bit-depth scaling function or a method of using a lookup table.

Figure 3:
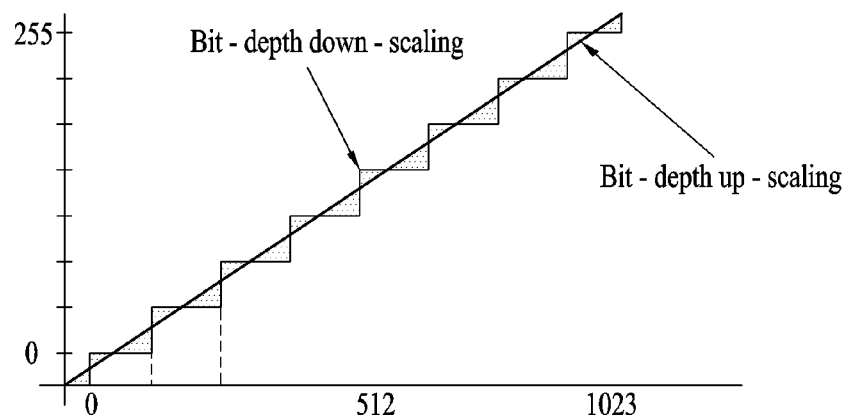
FIG. 3 is a diagram showing an example of scaling a bit depth using a bit depth scaling function.

FIG. 3 is a diagram showing an example of scaling a bit depth using a bit depth scaling function. The bit depth scaling function may be variously defined. For example, the bit depth scaling function may be defined as a one-dimensional function for linearly increasing the bit depth before and after scaling or a non-linear function such as an exponential function or a logarithm function.

This figure shows an example of defining a function for changing a bit relationship between an 8-bit bit depth (vertical axis) and a 10-bit bit depth (horizontal axis) via scaling as a one-dimensional linear function. In this figure, values in a predetermined range may be approximated to the same value to downscale the bit depth or the same value may be upscaled to values in a predetermined range, using a method similar to quantization.

Figure 4:
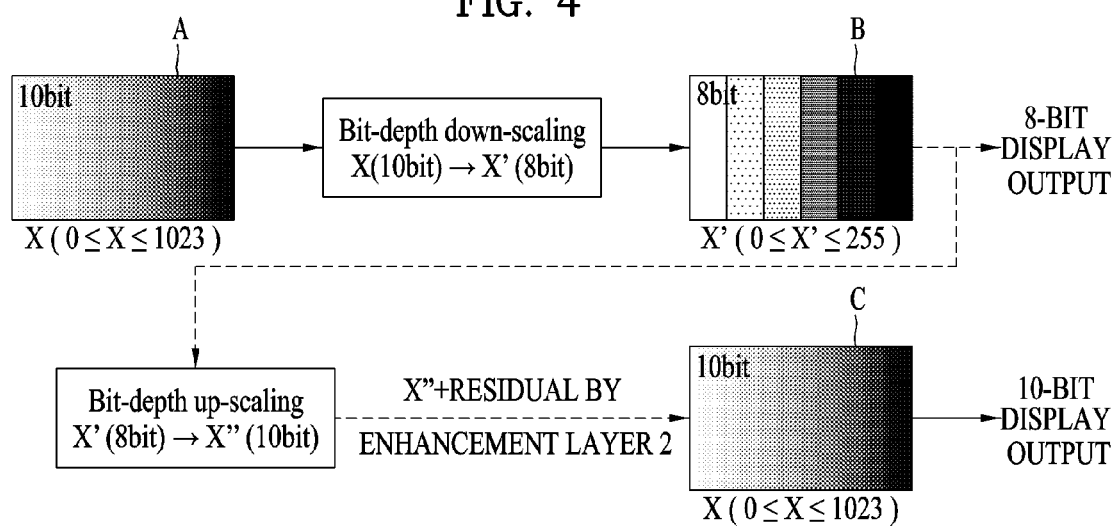
FIG. 4 is a diagram showing an example of displaying video using compatible bit depth information.

FIG. 4 is a diagram showing an example of displaying video using compatible bit depth information. With reference to this figure, an example of upscaling or downscaling the bit depth will now be described.

Video A in a color gamut of a 10-bit bit depth may be downscaled to video B in a color depth of an 8-bit bit depth and video B may be displayed. Video B in the color gamut of the 8-bit bit depth may be upscaled to video C in a color gamut of a 10-bit bit depth according to a bit depth up scaling method and video C may be displayed. At this time, when SVC coding is used for video C in the color gamut of the 10-bit bit depth, residual data may be additionally used in an enhancement layer (described below).

When a scaling function is used upon performing bit depth scaling, a parameter capable of defining a function in a transmitter, e.g., a coefficient of a function is transmitted. A receiver may perform bit depth scaling using the parameter.

For example, when the transmitter transmits information on a scaling function having the form of y=a*x+b, information including a function type "linear" and function coefficients "a and b" may be transmitted. The type and coefficient of a non-linear function may be transmitted and received. In addition, when a parameter of a piecewise continuous function is transmitted and received, information on an interval to which the function is applied and a function type and coefficient may be transmitted in interval units.

As another method of upscaling or downscaling a bit depth, a lookup table is used. This method directly maps two values belonging to different domains and thus is efficiently used to express a bit depth relationship when a scaling relationship is too complicated to be expressed by a function or is not previously defined.

Figure 5:
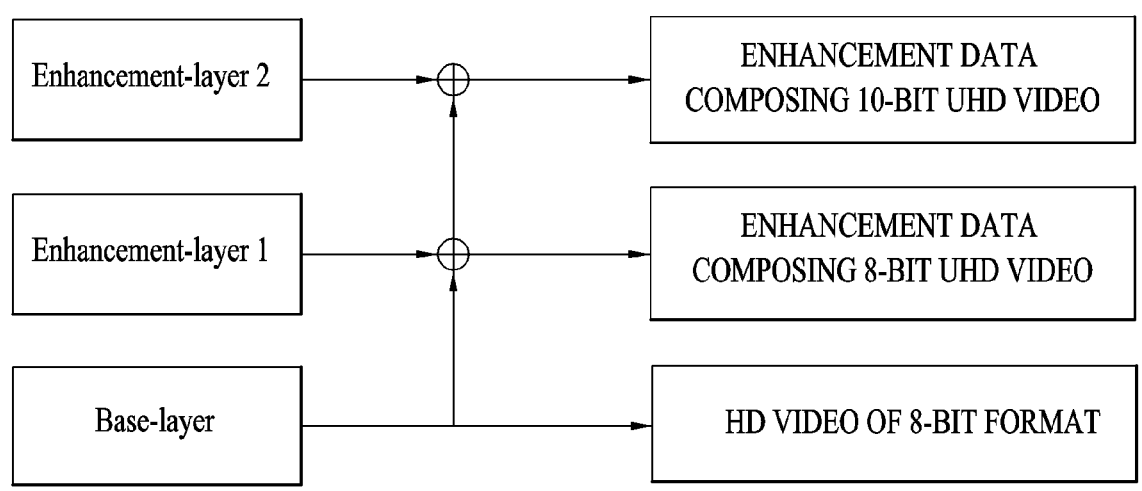
FIG. 5 is a diagram showing a method of transmitting video having a 10-bit bit depth which is compatible with video having an 8-bit bit depth.

FIG. 5 is a diagram showing a method of transmitting video having a 10-bit bit depth which is compatible with video having an 8-bit bit depth. Video having different bit depths and resolutions may be displayed according to performance of a receiver using scalable video coding.

Video having a 10-bit bit depth may be encoded using video having an 8-bit bit depth as follows.

First, HD video having an 8-bit bit depth is encoded into a base layer data. The base layer data having HD resolution is upscaled to data having UHD resolution. First residual data which is a difference between the upscaled data of the base layer data having HD resolution and UHD video (e.g., 4K UHD video) is encoded into first enhancement layer data.

Second residual data which is a difference between UHD video of a 10-bit bit depth and UHD video having an 8-bit bit depth is encoded into second enhancement data.

Figure 6:
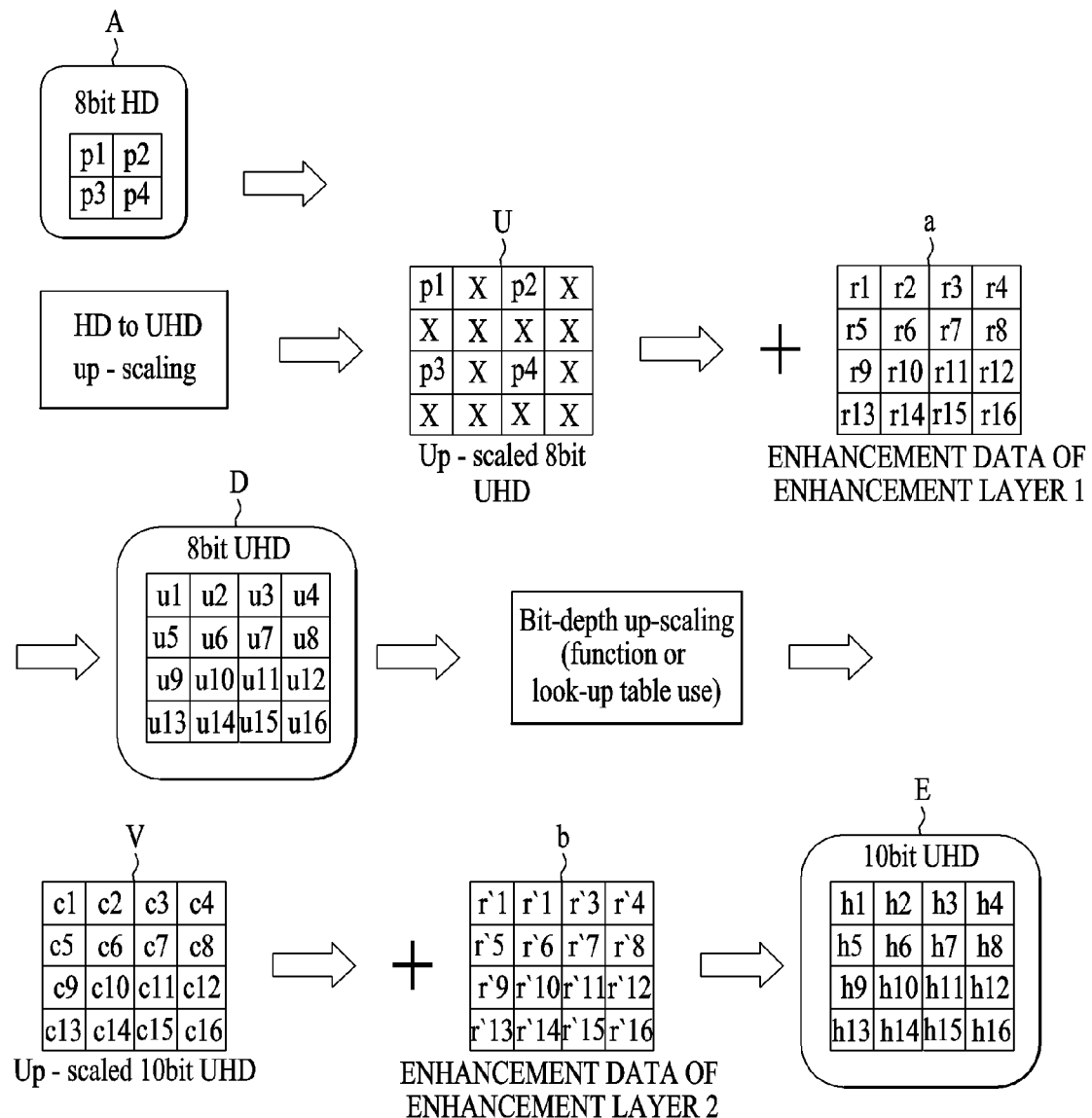
FIG. 6 is a diagram illustrating an example of a method of transmitting video having a 10-bit bit depth which is compatible with video having an 8-bit bit depth.

FIG. 6 is a diagram illustrating an example of a method of transmitting video having a 10-bit bit depth which is compatible with video having an 8-bit bit depth.

8-bit video A having HD resolution is upscaled from HD to UHD to be converted into 8-bit UHD video U. The first residual data a, which is the difference between the upscaled 8-bit UHD video U and 8-bit UHD video D, is merged into upscaled 8-bit UI-ID video U to generate 8-bit UHD video D. At this time, the first residual data a is encoded into first enhancement layer data.

Using the above-described bit depth upscaling method (function or lookup table), the 8-bit UHD video D is upscaled to 10-bit UHD V. Using second residual data b which is a difference between the 8-bit UHD video D and 10-bit video UHD video E, 10-bit UHD video E may be generated. At this time, the second residual data b may be encoded into second enhancement layer data.

From the viewpoint of the receiver, when the 8-bit video A having HD resolution, which is the base layer data, and the first enhancement layer data a are decoded, the received 8-bit video A having HD resolution may be converted into 8-bit UHD video.

In addition, when the bit depth upscaling method using the function or the lookup table is used, the upscaled 10-bit UHD video V and the second enhancement layer data b are merged and decoded to obtain the 10-bit UHD video E.

FIG. 7 is a diagram showing the structure of a video stream capable of displaying HD video in a color gamut of 8 bits and UHD video in a color gamut of 10 bits according to performance of a receiver.

A stream E carrying 10-bit UHD video includes a stream D carrying 8-bit UHD video and second enhancement layer data b which is a difference between 10-bit UHD video E and 8-bit UHD video D and may include metadata (UHD composition metadata) M which is information on the stream structure.

The metadata (UHD composition metadata) M may include information on bit depth scaling of video (scaling function or lookup table) and information related to filtering (e.g., filter tap, filter coefficient, etc.).

8-bit UHD video D may include 8-bit HD video A used for a conventional HD broadcast service and first enhancement layer data a which is a difference between 8-bit UHD video A and 8-bit UHD video. Although 4K UHD video is shown herein, when video resolution increases, the size of enhancement layer data which is residual data may be changed and transmitted with a similar structure.

The receiver may display 8-bit HD video A, 8-bit UHD video D or 10-bit UHD video E by referring to the metadata M according to performance thereof. The metadata M may provide information enabling 8-bit video to be converted into 10-bit video to display 10-bit video.

Figure 8:
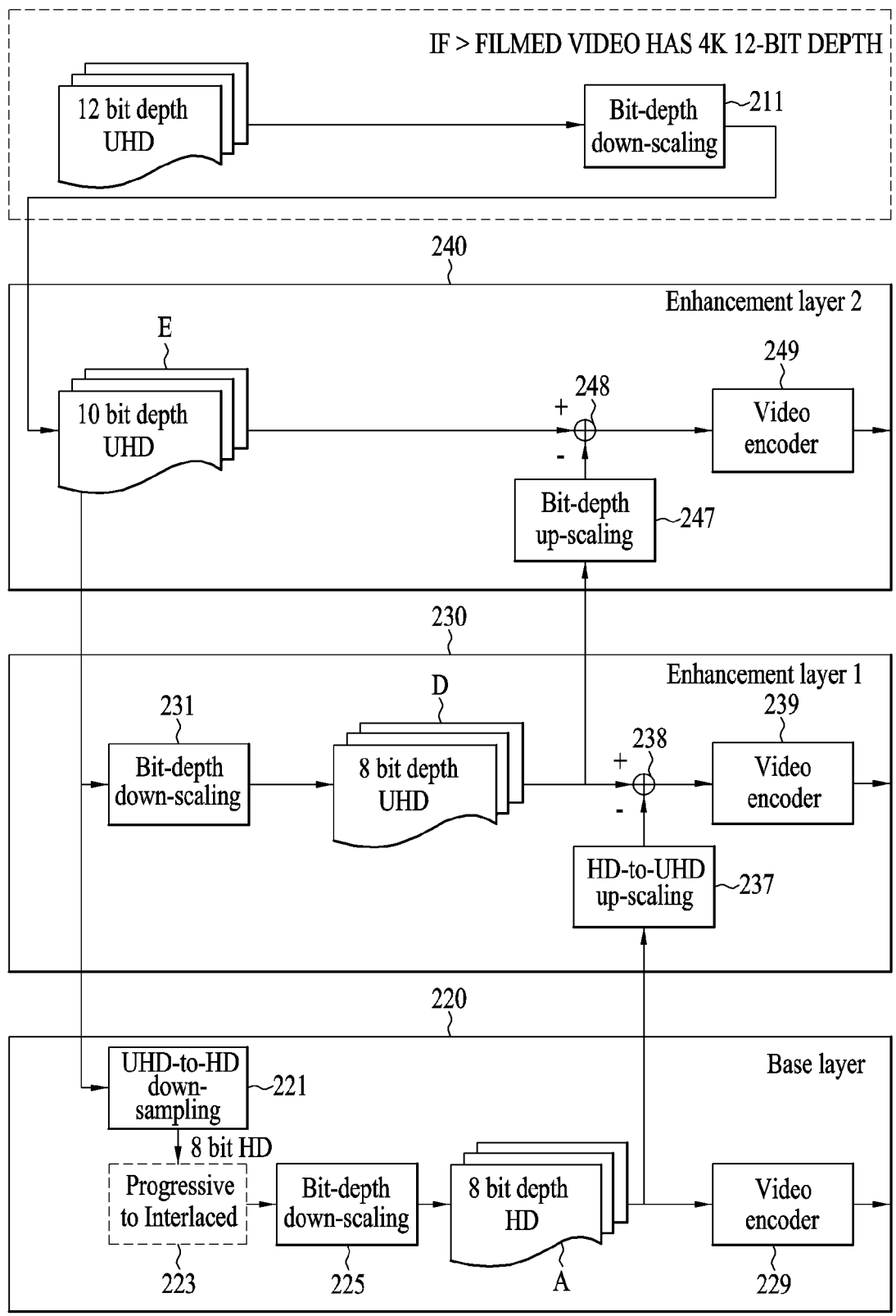
FIG. 8 is a diagram showing an embodiment of a video signal transmission apparatus capable of displaying video having different compatible bit depths according to performance of a receiver.

FIG. 8 is a diagram showing an embodiment of a video signal transmission apparatus capable of displaying video having different compatible bit depths according to performance of a receiver.

First, a downscaling unit 211, as an example of a transmission apparatus, may downscale the bit depth of 12-bit video having 4K resolution to output 10-bit UHD video E. Although filmed video is shown as being 12-bit video having 4K resolution, a similar embodiment is applicable to the other resolution. For example, if 12-bit 4K UHD video is processed, the downscaling unit 211 is necessary. However, if 10-bit UHD video is processed, the downscaling unit 211 is not necessary.

One embodiment of the transmission apparatus may include a base layer data processor 220, a first enhancement layer data processor 230 and a second enhancement layer data processor 240.

First, the first scaling unit 221 of the base layer data processor 220 may downscale 10-bit UHD video E into HD-resolution video and output 8-bit HD video.

The first sampling unit 221 may downsampled 10-bit UHD video into 10-bit HD video and a second sampling unit 225 may downscale the bit depth of video, for example, scale 10-bit HD video into 8-bit HD video A. The first video encoder 229 may encode 8-bit HD video A and output the encoded data as base layer data.

The base layer data processor 220 may include a scan change unit 223 for changing progressive video into interlaced video.

The locations of the first sampling unit 221 and the second sampling unit 225 of the base layer data processor 220 may be changed. Then, the second sampling unit 225 may downscale the bit depth of video and the first sampling unit 221 may downscale resolution of video.

One embodiment of the transmission apparatus may include a first enhancement layer data processor 230 in order to support 8-bit UHD video.

A third scaling unit 237 may downscale the bit depth of 10-bit UHD video and output 8-bit UHD video D.

The third scaling unit 237 may upscale the 8-bit HD video output from the base layer data processor 220 into 8-bit UHD video and output the 8-bit UHD video.

A first calculator 238 outputs first residual data a which is a difference between the 8-bit UHD video D and the video upscaled by the third scaling unit 237. The second video encoder 239 encodes the first residual data and outputs first enhancement layer data.

One embodiment of the transmission apparatus may include a second enhancement layer data processor 230 in order to support 10-bit UHD video.

A fourth scaling unit 247 may upscale the bit depth of 8-bit UHD video and output the upscaled video. A second calculator 248 outputs second residual data b which is a difference between the 10-bit UHD video E and video, the bit depth of which is upscaled by the fourth scaling unit 247. A third video encoder 249 encodes the second residual data b and outputs second enhancement layer data.

Figure 9:
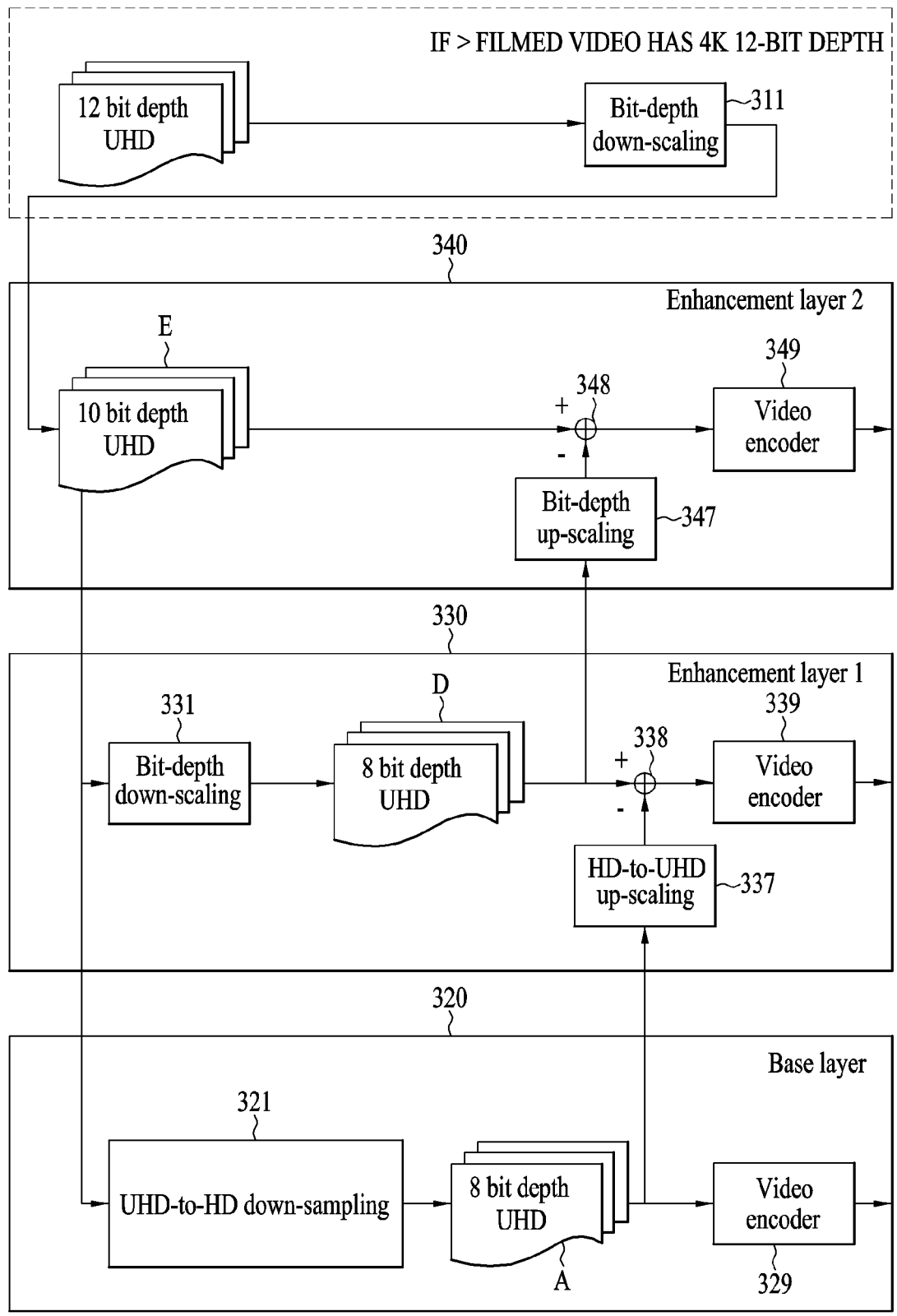
FIG. 9 is a diagram showing another embodiment of a video signal transmission apparatus capable of displaying video having different compatible bit depths according to performance of a receiver.

FIG. 9 is a diagram showing another embodiment of a video signal transmission apparatus capable of displaying video having different compatible bit depths according to performance of a receiver. FIG. 9 is similar to FIG. 8 except that the base layer data processor 320 may simultaneously change a scan method and a sampling method to change 8-bit progressive UHD video into interlaced 8-bit HD video, which will now be described in detail.

A downscaling unit 311, as an example of a transmission apparatus, may downscale the bit depth of 12-bit video having 4K resolution to output 10-bit UHD video E. As described above, although filmed video is shown as being 12-bit video having 4K resolution, a similar embodiment is applicable to the other resolution. For example, if 12-bit 4K UHD video is processed, the downscaling unit 311 is necessary. However, if 10-bit UHD video is processed, the downscaling unit 311 is not necessary.

Accordingly, one embodiment of the transmission apparatus may include a base layer data processor 320, a first enhancement layer data processor 330 and a second enhancement layer data processor 340.

First, the first scaling unit 331 of the first enhancement layer data processor 330 may downscale the bit depth of the 10-bit UHD video E and output 8-bit UHD video D.

The first sampling unit 321 of the base layer data processor 320 downsamples UHD video into HD video. At this time, the progressive type UHD video may be converted into interlaced type HD video.

When the first sampling unit 321 outputs 8-bit HD video A, the first video encoder 329 may encode the 8-bit HD video A and output base layer data.

The second scaling unit 337 may upscale the 8-bit HD video A of the base layer data processor 320 into UHD video.

A first calculator 338 may encode first residual data, which is a difference between the 8-bit UHD video D output from the first scaling unit 331 of the first enhancement layer data processor 330 and the video scaled by the second scaling unit 337, into first enhancement layer data and output the first enhancement layer data.

The third scaling unit 347 of the second enhancement layer data processor 340 scales the bit depth of the 8-bit UHD video D of the first enhancement layer data processor 330 and outputs the scaled data.

A second calculator 348 calculates and outputs second residual data which is a difference between the 10-bit UHD video E and the data scaled by the third scaling unit 347. The third video decoder 349 encodes the second residual data output from the second calculator 348 and outputs second enhancement layer data.

Figure 10:
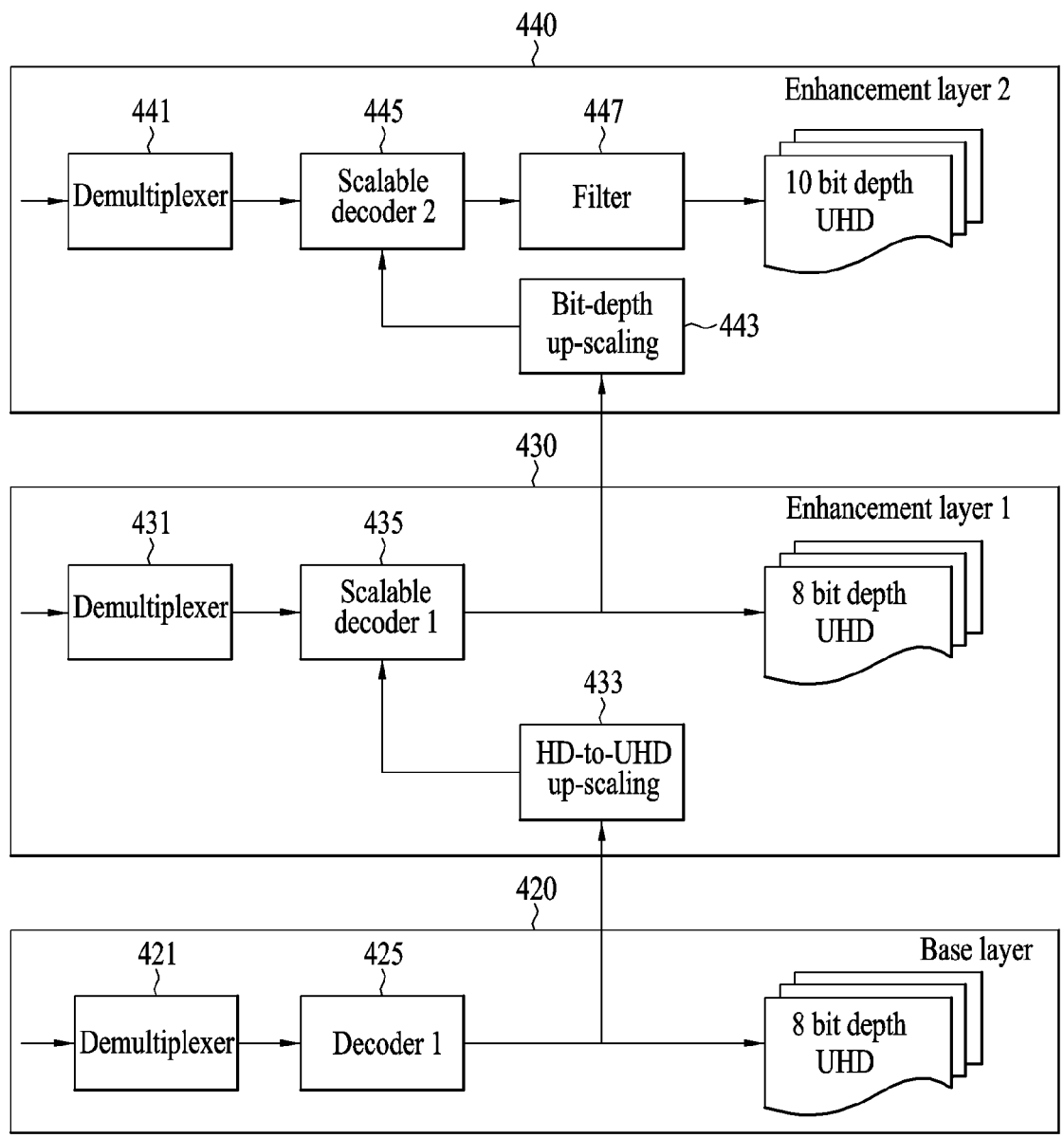
FIG. 10 is a diagram showing an embodiment of a signal reception apparatus capable of displaying video based on a bit depth according to a receiver.

FIG. 10 is a diagram showing an embodiment of a signal reception apparatus capable of displaying video based on a bit depth according to a receiver.

One embodiment of a signal reception apparatus may include a base layer data processor 420, may include a base layer data processor 420 and a first enhancement layer data processor 430 or may include a base layer data processor 420, a first enhancement layer data processor 430 and a second enhancement layer data processor 440.

A demultiplexer 421 of the base layer data processor 420 may demultiplex a stream carrying base layer data among video streams. A first decoder 425 may decode the base layer data demultiplexed by the demultiplexer 421 and output 8-bit HD video. Accordingly, even when an existing receiver receives a 10-bit UHD video stream, it is possible to decode HD video included in the stream.

A demultiplexer 431 of the first enhancement layer data processor 430 may demultiplex a stream carrying first enhancement layer data among video streams.

A first scaling unit 433 may scale the 8-bit HD video into 8-bit UHD video and output the 8-bit UHD video. A second decoder 435 may decode the first enhancement layer data demultiplexed by the demultiplexer 431 and the UHD video upscaled by the first scaling unit 433 using scalable video decoding and output the 8-bit UHD video.

The receiver capable of outputting the 8-bit UHD video B1) decodes base layer data (8-bit HD video), B2) up-samples the decoded result into UHD (and performs filtering) to output UHD video, B3) merges the first enhancement layer data and the video output in B2), B4) decodes the merged data and B5) outputs 8-bit UHD video.

A demultiplexer 441 of the second enhancement layer data processor 440 may demultiplex a stream carrying second enhancement layer data among video streams. The second scaling unit 443 upscales the bit depth of the video decoded by the second decoder 435 and outputs the scaled data.

A third decoder may decode the second enhancement layer data demultiplexed by the demultiplexer 441 and the video data, the bit depth of which is scaled by the second scaling unit 443, and output 10-bit UHD video.

Here, a filter 447 may perform filtering such that the 10-bit UHD video is naturally displayed.

The receiver capable of outputting the 10-bit UHD video C1) decodes base layer data (8-bit HD video), C2) up-samples the decoded result of C1) into UHD to output UHD video, and C3) converts 8-bit UHD video according to C2) into 10-bit UHD video. At this time, bit depth scaling function information acquired via EL2_bit_depth_scaling_info( ) which is scaling information of the below-described bit information, may be used.

The receiver may merge and encode the second enhancement layer data (residual data of 10-bit video), the first enhancement layer data (residual data of 8-bit video) and the result data of B2) and output 10-bit UHD video. Accordingly, it is possible to output HD or UHD video having different bit depths according to performance of the receiver.

Hereinafter, signaling information of video data, which is capable of signaling video transmitted and received according to the above-described embodiment of the present invention, will be described.

FIG. 11 is a diagram showing signaling information enabling display of video according to an embodiment of the present invention. This figure shows a PMT as signaling information at a system level, which may include a descriptor of a program level just behind program_info_length of the PMT and a descriptor of a stream level just behind an ES_info_length field.

This figure shows UHD_program_type_descriptor as an example of a descriptor of a program level.

descriptor_tag indicates the identifier of this descriptor and descriptor_length indicates the length of the descriptor.

UHD_program_format_type may identify bit depth information indicating a color gamut as described above.

For example, if UHD_program_format_type is 0x05, the video service has a video format compatible with the 8-bit HD video, the 8-bit UHD video and the 10-bit UHD video.

As an example of the descriptor of the stream level, a UHD composition descriptor may be included in the PMT. This descriptor may include information on a base layer video element, information on a first enhancement layer video element or information on a second enhancement layer video element.

FIG. 12 is a diagram showing the detailed syntax values of signaling information according to an embodiment of the present invention.

If signaling information of a broadcast signal is a PMT, the shown field values may indicate the following information.

As described above, according to the bit depth of video, streams carrying base layer data, first enhancement layer data and second enhancement layer data may be signaled based on the PMT.

For example, Stream_type may become a value of 0x02 indicating a video stream according to an MPEG-2 video codec.

Elementary_PID indicates the PID value of an elementary stream included in each program and has a value of 0x109A in this example. The descriptor of the stream level may include signaling information related to MPEG-2 video.

With respect to the stream carrying the first enhancement layer video, the following information may be included in the PMT.

Stream_type may be a type value (here, 0xA1) indicating the type of a stream according to HEVC scalable layer video codec.

Elementary_PID indicates the PID value of an elementary stream included in each program and indicates 0x109B in this example.

UHDTV_sub_stream_descriptor( ), which is the descriptor of the stream level, includes information on the first enhancement layer data and may include information necessary to compose the 8-bit UHD video using the base layer data and the first enhancement layer data.

With respect to the stream carrying the second enhancement layer video, the following information may be included in the PMT.

Stream_type may be a type value (here, 0xA2) indicating the type of a stream according to HEVC scalable layer video codec.

Elementary_PID indicates the PID value of an elementary stream included in each program and indicates 0x109C in this example.

UHDTV_composition_descriptor( ) which is the descriptor of the stream level includes information related to the second enhancement layer data and may include signaling information enabling display of the 10-bit UHD video using the base layer data, the first enhancement layer data and the second enhancement layer data.

FIG. 13 is a diagram showing an example of a stream level descriptor according to an embodiment of the present invention.

The stream level descriptor may include a descriptor_tag value capable of identifying this descriptor, descriptor_length indicating the length of this descriptor and UHD_composition_metadata( ) which is metadata composing a video stream.

In this example, information included in the UHD_composition_metadata( ) will now be described.

An EL2_video_codec_type field indicates codec information of a video element included in a UHD service. For example, this value may have the same value as stream_type of the PMT.

An EL2_video_profile field may indicate profile information of the video stream, that is, information on the standard feature necessary to decode the stream. Requirement information of the color depth (chroma subsampling) (4:2:0, 4:2:2, etc.), bit depth (8 bits, 10 bits), coding tool, etc. of the video stream may be included.

An EL2_video_level field is level information of the video stream and may include information on a technical element supporting range defined in the profile. For example, frame rate information or bit rate information may be included.

An EL2_video_tier_flag field indicates tier information of the video stream and may be divided into level information and a maximum bitrate. In HEVC, there are main tier and high tier and an EL2_video_tier_flag having a value of 0 means main tier.

An EL2_video_component_type field indicates which data is included if the video stream composes a UHD service, for example, whether the stream carries base layer data corresponding to 8-bit HD video, first enhancement layer data which is residual data included in 8-bit UHD video or second enhancement layer data included in 10-bit UHD video.

An EL2_video_scaling_type field may indicate whether the bit depth is upscaled or downscaled. This will be described below with reference to the figure.

An original_UHD_video_type field signals information on a UHD video format and may indicate basic information such as the resolution and frame rate of video. This will be described in detail below.

An original_UHD_video_bit_depth_type field indicates information on a bit depth format of original UHD video. This will be described in detail below.

An EL2_video_diff_bit_depth field indicates information on a difference between the bit depth of original UHD video and the bit depth of a signal transmitted by an enhancement layer. This will be described in detail below.

An original_UHD_video_bit_depth_type field has 8 bits. When the value of the EL2_video_diff_bit_depth field is 00, only one EL2_bit_depth_scaling_type may be used with respect to an interval of 256 to 1023. However, the interval of 256 to 1023 may be divided into several intervals to support different EL2_bit_depth_scaling_types according to image properties. In this example, the interval is divided into several intervals by num_intervals. Since a start point and an end point of each interval should be signaled, interval_start and interval_end are further signaled.

An EL2_bit_depth_scaling_type field indicates a scaling method. This will be described in detail below.

An EL2_bit_depth_scaling_info( ) field indicates additional information of a scaling method of a bit depth. This will be described in detail below.

A bit_depth_upscale_filter( ) field indicates filtering information upon upscaling of video. This will be described in detail below.

FIG. 14 is a diagram showing scaling information of metadata.

An EL2_video_scaling_type field may indicate whether the bit depth is upscaled or downscaled. In this example, 0 of this field indicates bit-depth downscaling and 1 indicates bit-depth upscaling.

FIG. 15 is a diagram showing original video information of metadata.

An original_UHD_video_type field may indicate the resolution and frame rate of video. In this figure, various resolutions and frame rates are possible according to the value of this field. For example, if the value of the original_UHD_video_type field is 0101, original video may have 60 frames per second and resolution of 4096×2160. Here, P denotes a progressive scan method.

FIG. 16 is a diagram showing information on a bit depth type of original video of metadata.

According to this example, the bit dept type of original UHD video may be 8 bits, 10 bits, 12 bits, etc. depending on whether the value of this field is 00, 01, 10, etc., respectively.

FIG. 17 is a diagram showing information indicating a difference in bit depth between original video of metadata and transmitted video.

The EL2_video_diff_bit_depth field of the metadata indicates information on the difference between the bit depth of original video and the bit depth of data transmitted by the enhancement layer.

For example, if original video is expressed by a 10-bit bit depth and base layer data and video carried by the enhancement layer are expressed by an 8-bit bit depth, the difference between the original video and the transmitted video is 2 bits. In this case, the value of the EL2_video_diff_bit_depth field is 00.

If the difference between the original video and the transmitted video is 4 bits, the value of the EL2_video_diff_bit_depth field is 01.

FIG. 18 is a diagram showing information indicating the type of bit scaling of metadata.

For example, the EL2_bit_depth_scaling_type field indicates the type information of downscaling of the bit depth or upscaling of the bit depth. Here, the type information may indicate a function or a lookup table.

For example, the scaling type of the bit depth is a linear function if the EL2_bit_depth_scaling_type field is 0x00, is a logarithmic function if the EL2_bit_depth_scaling_type field is 0x01, is an exponential function if the EL2_bit_depth_scaling_type field is 0x02 and is a lookup table if the EL2_bit_depth_scaling_type field is 0x03.

FIG. 19 is a diagram showing additional information on a scaling method of a bit depth of metadata. EL2_bit_depth_scaling_info( ) of the metadata indicates additional information according to the downscaling or upscaling method of the bit depth.

At this time, EL2_bit_depth_scaling_info( ) may signal additional information according to a combination of the EL2_video_diff_bit_depth field which is the difference between the above-described bit depths and the EL2_bit_depth_scaling_type indicating the bit-depth scaling type.

For example, if the EL2_video_diff_bit_depth field and the EL_bit_depth_scaling_type field are 00 (the difference between the bit depth is 2 bits and a linear function is used), linear function parameter information for bit-depth downscaling and linear function parameter information for bit-depth upscaling (e.g., a y_intercept value and gradient information in a linear function) may be defined and transmitted (e.g., y=ax+b and information on a and b are transmitted).

As another example, if the EL2_bit_depth_scaling_type is a piecewise linear function, information on a piecewise gradient for reproducing a function or x- and y_intercepts may be provided as additional information or a non-linear function may be divided according to function type to provide necessary information.

The function type for converting the bit depth may be defined using this field and information on a coefficient or index necessary therefor may be delivered to the receiver.

If EL2_bit_depth_scaling_type is a lookup table, the lookup table may be defined and information thereon may be transmitted. This will now be described in detail with reference to the figure.

In this example, if EL2_bit_depth_scaling_type is 0x00, the scaling method may be a linear function and parameters such as the y_intercept and gradient of the linear function may be transmitted.

If EL2_video_scaling_type is 1 (upscaling of the bit depth) and EL2_bit_depth_scaling_type is 0x01, the scaling method is a logarithmic function and function parameters thereof may include the base, offset and log function coefficients coeff_m and coeff_a of the logarithmic function. These parameters will be described in Equation X.

If EL2_video_scaling_type is 1 (upscaling of the bit depth) and EL2_bit_depth_scaling_type is 0x02, the scaling method is an exponential function and function parameters thereof may include offset, coeff_m and coeff_a. These function parameters will be described in Equation X.

EL2_video_scaling_type is 1 (upscaling of the bit depth) and EL2_bit_depth_scaling_type is 0x03, the scaling method is a lookup table. Entry_length indicates the length of the lookup table and the scaling method may be expressed by an input value In_value of the 8-bit bit depth and an output value Out_value of the 10-bit bit depth.

That is, in_value and out_value may uniquely define mapping of different bit depth values by the number indicated by Entry_length. If the lookup table is signaled, section data of broadcast signaling may be transmitted in addition to a descriptor or an SEI message. This will be described in detail below.

According to the embodiment of the present invention, the scaling method and the parameters according to the scaling method may be signaled.

The function type may be signaled according to EL2_bit_depth_scaling_type and the type of the parameter to be transmitted may be changed according to the function type.

$$\text{out}=\text{gradient}\times\text{in}+y\_\text{intercept} \qquad \text{Equation 1}$$

Equation 1 shows a linear function as a scaling function.

A transformation equation according to the function type is as follows. At this time, "in" denotes the pixel value of a domain to be transformed and "out" denotes the pixel value of a domain after transformation.

Figures 20, 21:
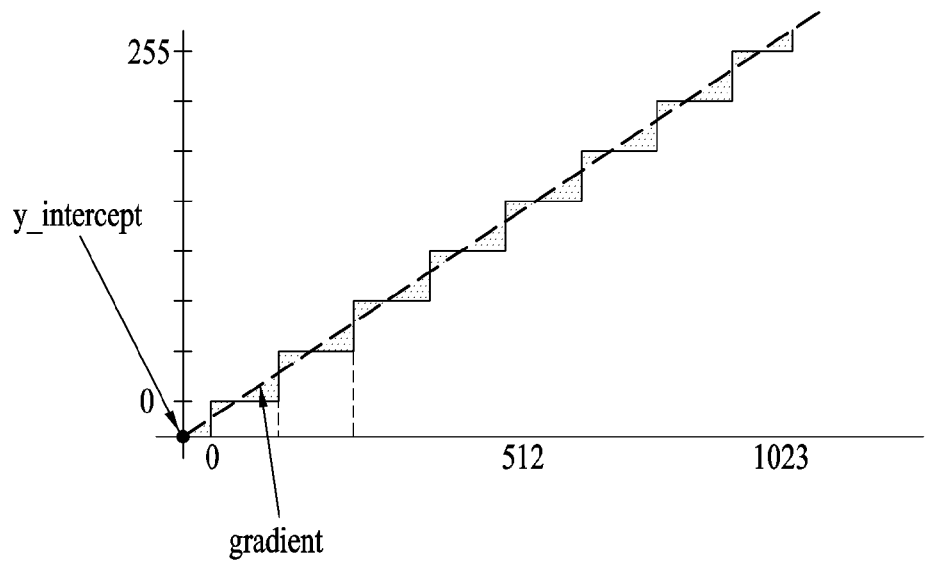
FIG. 20 is a diagram showing a method of scaling a bit depth using a linear function shown in Equation 1.
FIG. 21 is a diagram showing an example of section data when a lookup table capable of converting a bit depth is transmitted in the form of section data.

FIG. 20 is a diagram showing a method of scaling a bit depth using a linear function shown in Equation 1. In this figure, a horizontal axis x denotes the bit value of a 10-bit bit depth and a vertical axis y denotes the bit value of an 8-bit bit depth.

In this figure, a gradient is denoted by a dotted line and a y_intercept denotes a vertical-axis y value if x is 0. According to this example, the 10-bit bit depth and the 8-bit bit depth may be transformed into each other using a linear function.

$$\text{out} = \text{coeff\_}m \times \log_{base} \text{in} + \text{coeff\_}a \qquad \text{Equation 2}$$

Similarly, Equation 2 denotes the function and the function parameters such as base, coeff_m and coeff_a if the scaling function is a logarithmic function. Scaling may be performed using the logarithmic function and the value may be corrected via the offset. The function parameters of Equation 2 may be signaled in the case of the logarithmic function of FIG. 19.

$$\text{out} = \text{coeff\_}m \times e^{in} + \text{coeff\_}a \qquad \text{Equation 3}$$

Equation 3 shows the function and the function parameters such as coeff_m and coeff_a if the scaling function is an exponential function. Scaling may be performed using the exponential function and the value may be corrected via the offset. The function parameters of Equation 3 may be included as signaling information in the case of the exponential function of FIG. 19. If the lookup table is signaled, section data of broadcast signaling may be transmitted in addition to a descriptor or an SEI message. This will be described in detail below.

FIG. 21 is a diagram showing an example of section data when a lookup table capable of converting a bit depth is transmitted in the form of section data.

If a lookup table is transmitted as section data of a broadcast signal, information included in a section table is as follows.

A table_id field indicates the identifier of the section table and a section_syntax_indicator field indicates a value indicating the section syntax and may be set to an arbitrary value (e.g., 1).

A private_indicator field may be set to an arbitrary value (e.g., 1).

A private_section_length field indicates the length of fields after a current section.

A scaling_id field indicates whether in/value mapping values from different sections are the same because all in/value mapping values may not be transmitted from one section when several sections are transmitted in order to transmit a lookup table.

That is, a bit-depth scaling function may be defined by scaling_id and a part or whole of the function may be transmitted. If only the part of the function is transmitted, the receiver may combine section data having the same scaling_id value and restore the whole function.

A scaling_version_num field may become the version number of a scaling method or a lookup table.

In the case of scaling data received via different sections, the same scaling functions have the same scaling_id and out_values for different in_values may be identified using scaling_version_num.

When signaling is performed using scaling information via an LUT, a plurality of table information or section information may be transmitted. In this case, if a scaling function is used, scaling_ids of the tables are the same. As another example, if the same scaling function is used but the section is different (that is, in_value and out_value are different), table information or section information may be signaled using a scaling version number.

If out_value is redefined for the same in_value, scaling_version_number may be used. Accordingly, if the receiver receives scaling data having different out_values for in_value already existing for the same scaling_id, scaling_version_number overrides existing data using larger data.

Entry_length, in_value and out_value are described above. That is, Entry_length indicates the length of the lookup table and a scaling method may be expressed by an input value In_value of an 8-bit bit depth and an output value Out_value of a 10-bit bit depth.

FIG. 22 is a diagram showing the case in which the above-described descriptors are included in other signaling information. This figure shows the case in which the shown descriptors are included in an SDT.

A table_id field indicates the identifier of the table.

A section_syntax_indicator field is a 1-bit field which shall be set to "1" with respect to an SDT table section (section_syntax_indicator: The section_syntax_indicator is a 1-bit field which shall be set to "1").

A section_length field indicates the length of the section in bytes. (section_length: This is a 12-bit field, the first two bits of which shall be "00". It specifies the number of bytes of the section, starting immediately following the section_length field and including the CRC. The section_length shall not exceed 1021 so that the entire section has a maximum length of 1024 bytes.)

A transport_stream_id field indicates a TS identifier provided by this SDT from any other multiplex within a delivery system. (transport_stream_id: This is a 16-bit field which serves as a label for identification of the TS, about which the SDT informs, from any other multiplex within the delivery system.)

A version_number field indicates the version number of this sub table. (version_number: This 5-bit field is the version number of the sub_table. The version_number shall be incremented by 1 when a change in the information carried within the sub_table occurs. When it reaches value "31", it wraps around to "0". When the current_next_indicator is set to "1", then the version_number shall be that of the currently applicable sub_table. When the current_next_indicator is set to "0", then the version_number shall be that of the next applicable sub_table.)

A current_next_indicator field indicates whether this sub table is currently or next applicable. (current_next_indicator: This 1-bit indicator, when set to "1", indicates that the sub_table is the currently applicable sub_table. When the bit is set to "0", it indicates that the sub_table sent is not yet applicable and shall be the next sub_table to be valid.)

A section_number field indicates the number of the section. (section_number: This 8-bit field gives the number of the section. The section_number of the first section in the sub_table shall be "0x00". The section_number shall be incremented by 1 with each additional section with the same table_id, transport_ stream_ id, and original_network_id.)

A last_section_number field indicates the number of a last section. (last_section_number: This 8-bit field specifies the number of the last section (that is, the section with the highest section_number) of the sub_table of which this section is part.)

An original_network_id field indicates the network ID of the delivery system. (original_network_id: This 16-bit field gives the label identifying the network_id of the originating delivery system.)

A service_id field indicates the service ID within the TS. (service_id: This is a 16-bit field which serves as a label to identify this service from any other service within the TS.

The service_id is the same as the program_number in the corresponding program_map_section.)

An EIT_schedule_flag field may indicate whether EIT schedule information for the service is present in the current TS. (EIT_schedule_flag: This is a 1-bit field, which when set to "1", indicates that EIT schedule information for the service is present in the current TS, see TR 101 211 [i.2] for information on maximum time interval between occurrences of an EIT schedule sub_table). If the flag is set to 0, then the EIT schedule information for the service should not be present in the TS.)

An EIT_present_following_flag field may indicate whether EIT_present_following information for the service is present in the current TS. (EIT_present_following_flag: This is a 1-bit field which when set to "1" indicates that EIT_present_following information for the service is present in the current TS, see TR 101 211 [i.2] for information on maximum time interval between occurrences of an EIT present/following sub_table. If the flag is set to 0, then the EIT present/following information for the service should not be present in the TS.)

A running_status field may indicate the status of the service defined in Table 6 of the DVB-SI document. (running_status: This is a 3-bit field indicating the status of the service as defined in table 6. For an NVOD reference service, the value of the running_status shall be set to "0".)

A free_CA_mode field indicates whether all component streams of the service are scrambled. (free_CA_mode: This 1-bit field, when set to "0", indicates that all the component streams of the service are not scrambled. When set to "1", it indicates that access to one or more streams may be controlled by a CA system.)

A descriptors_loop_field indicates the length of the following descriptors. (descriptors_loop_length: This 12-bit field gives the total length in bytes of the following descriptors.)

A CRC_32 field is a 32-bit field including a CRC value. (CRC_32: This is a 32-bit field that contains the CRC value that gives a zero output of the registers in the decoder.)

A descriptors_loop_length field may include a UHD_program_type_descriptor shown in FIG. 11 and a UHD_composition_descriptor shown in FIG. 13 at the location of a next descriptor.

If the UHD_composition_descriptor, which is signaling information, is included in the SDT of the DVB, the UHD_component_descriptor may further include a component_tag field. The component_tag field may indicate the PID value of the stream signaled from the PMT of the PSI level. The receiver may find the PID value of the stream together with the PMT using the component_tag field.

FIG. 23 is a diagram showing the case in which the above-described descriptors are included in other signaling information. This figure shows the case in which the above-described descriptors are included in an EIT.

The EIT may follow ETSI EN 300 468. Using this, the fields will now be described.

A table_id indicates the ID of the table.

A section_syntax_indicator field is a 1-bit field which shall be set to 1 for an EIT table section. (section_syntax_indicator: The section_syntax_indicator is a 1-bit field which shall be set to "1".)

A section_length field indicates the length of the section in bytes. (section_length: This is a 12-bit field. It specifies the number of bytes of the section, starting immediately following the section_length field and including the CRC. The section_length shall not exceed 4093 so that the entire section has a maximum length of 4096 bytes.)

A service_id field indicates the ID of the service in a TS. (service_id; This is a 16-bit field which serves as a label to identify this service from any other service within a TS. The service_id is the same as the program_number in the corresponding program_map_section.)

A version_number field indicates the version number of this sub table. (version_number: This 5-bit field is the version number of the sub_table. The version number shall be incremented by 1 when a change in the information carried within the sub_table occurs. When it reaches value 31, it wraps around to 0. When the current_next_indicator is set to "1", then the version_number shall be that of the currently applicable sub_table. When the current_next_indicator is set to "0", then the version_number shall be that of the next applicable sub_table.)

A current_next_indicator field indicates whether this sub table is currently or next applicable. (current_next_indicator: This 1-bit indicator, when set to "1", indicates that the sub_table is the currently applicable sub_table. When the bit is set to "0", it indicates that the sub_table sent is not yet applicable and shall be the next sub_table to be valid.)

A section_number field indicates the number of the section. (section_number: This 8-bit field gives the number of the section. The section_number of the first section in the sub_table shall be "0x00". The section_number shall be incremented by 1 with each additional section with the same table_id, service_id, transport_stream_id, and original_network_id. In this case, the sub_table may be structured as a number of segments. Within each segment the section_number shall be incremented by 1 with each additional section, but a gap in numbering is permitted between the last section of a segment and the first section of the adjacent segment.)

A last_ection number field indicates the number of a last section. (last_section_number: This 8-bit field specifies the number of the last section (that is, the section with the highest section_number) of the sub table of which this section is part.)

A transport_stream_id field indicates a TS identifier provided by this EIT from any other multiplex within a delivery system (transport_stream_id: This is a 16-bit field which serves as a label for identification of the TS, about which the EIT informs, from any other multiplex within the delivery system.).

An original_network_id field indicates the network ID of the delivery system. (original_network_id: This 16-bit field gives the label identifying the network_id of the originating delivery system.)

A segment_last_section_number field indicates the number of the last section of this segment of this sub table. (segment_last_section_number: This 8-bit field specifies the number of the last section of this segment of the sub_table. For sub_tables which are not segmented, this field shall be set to the same value as the last_section_number field.)

A last_table_id field indicates the identification number of the last table. (last_table_id: This 8-bit field identifies the last table_id used (see table 2).)

An event_id field indicates the identification number of the event. (event_id: This 16-bit field contains the identification number of the described event (uniquely allocated within a service definition.)

A start_time field includes the start time of the event. (start_time: This 40-bit field contains the start time of the event in coordinated universal time (UTC) and Modified Julian Date (MJD) (see annex C). This field is coded as 16 bits giving the 16 LSBs of MJD followed by 24 bits coded as 6 digits in the 4-bit Binary Coded Decimal (BCD). If the start time is undefined (e.g., for an event in a NVOD reference service) all bits of the field are set to "1".)

A running_status field may indicate the status of the event defined in Table 6 of the DVB-SI document. (running_status: This is a 3-bit field indicating the status of the event as defined in table 6. For an NVOD reference event, the value of the running_status shall be set to "0".)

A free_CA_mode field indicates whether all component streams of the service are scrambled. (free_CA_mode: This 1-bit field, when set to "0", indicates that all the component streams of the service are not scrambled. When set to "1", it indicates that access to one or more streams may be controlled by a CA system.)

A descriptors_loop_length field indicates the length of the following descriptors. (descriptors_loop_length: This 12-bit field gives the total length in bytes of the following descriptors.)

A CRC_32 field is a 32-bit field including a CRC value. (CRC_32: This is a 32-bit field that contains the CRC value that gives a zero output of the registers in the decoder.)

A descriptors_loop_length field may include a UHD_program_type_descriptor shown in FIG. 11 and a UHD_composition_descriptor shown in FIG. 13 at the location of a next descriptor.

If the UHD_composition_descriptor is included in the EIT of the DVB, the UHD_component_descriptor may further include a component_tag field. The component_tag field may indicate the PID value of the stream signaled from the PMT of the PSI level. The receiver may find the PID value of the stream together with the PMT using the component_tag field.

FIG. 24 is a diagram showing the case in which the above-described descriptors are included in other signaling information. This figure shows the case in which the above-described descriptors are included in a VCT.

The VCT may follow ATSC PSIP standard. According to ATSC PSIP, the fields will now be described. Bits will now be described.

A table_id field indicates an 8-bit unsigned integer number indicating the type of a table section. (table_id—An 8-bit unsigned integer number that indicates the type of table section being defined here. For the terrestrial_virtual_channel_table_section( ) the table_id shall be 0xC8.)

A section_syntax_indicator field is a 1-bit field set to 1 for a VCT table section. (section_syntax_indicator—The section_syntax_indicator is a one-bit field which shall be set to "1" for the terrestrial_virtual_channel_table_section( ).)

A private_indicator field is set to 1. (private_indicator—This 1-bit field shall be set to "1".)

A section_length field indicates the length of the section in bytes. (section_length—This is a twelve bit field, the first two bits of which shall be "00". It specifies the number of bytes of the section, starting immediately following the section_length field, and including the CRC.)

A transport_stream_id field indicates an MPEG-TS ID as in a PAT capable of identifying a TVCT. (transport_stream_id—The 16-bit MPEG-2 Transport Stream ID, as it appears in the Program Association Table (PAT) identified by a PID value of zero for this multiplex. The transport_stream_id distinguishes this Terrestrial Virtual Channel Table from others that may be broadcast in different PTCs.)

A version number field indicates the version number of the VCT. (version_number—This 5-bit field is the version number of the virtual channel table. For the current VCT (current_next_indicator="1"), the version number shall be incremented by 1 whenever the definition of the current VCT changes. Upon reaching the value 31, it wraps around to 0. For the next VCT (current_next_indicator="0"), the version number shall be one unit more than that of the current VCT (also in modulo 32 arithmetic). In any case, the value of the version_number shall be identical to that of the corresponding entries in the MGT.)

A current_next_indicator field indicates whether this sub table is currently or next applicable. (current_next_indicator—This one-bit indicator, when set to "1", indicates that the virtual channel table sent is the currently applicable. When the bit is set to "0", it indicates that the table sent is not yet applicable and shall be the next table to become valid. This standard imposes no requirement that "next" tables (those with current_next_indicator set to "0") must be sent. An update to the currently applicable table shall be signaled by incrementing the version_number field.)

A section_number field indicates the number of the section. (section_number—This 8-bit field gives the number of this section. The section_number of the first section in the Terrestrial Virtual Channel Table shall be "0x00". It shall be incremented by one with each additional section in the Terrestrial Virtual Channel Table.)

A last_section_number field indicates the number of a last section. (last_section_number—This 8-bit field specifies the number of the last section (that is, the section with the highest section_number) of the complete Terrestrial Virtual Channel Table.)

A protocol_version field indicates a protocol version for a parameter to be defined differently from a current protocol in the future (protocol_version—An 8-bit unsigned integer field whose function is to allow, in the future, this table type to carry parameters that may be structured differently than those defined in the current protocol. At present, the only valid value for protocol_version is zero. Non-zero values of protocol_version may be used by a future version of this standard to indicate structurally different tables.)

A num_channels_in_section field indicates the number of virtual channels of this VCT. (num_channels_in_section—This 8-bit field specifies the number of virtual channels in this VCT section. The number is limited by the section length.)

A short_name field indicates the name of the virtual channel (short_name—The name of the virtual channel, represented as a sequence of one to seven 16-bit code values interpreted in accordance with the UTF-16 representation of Unicode character data. If the length of the name requires fewer than seven 16-bit code values, this field shall be padded out to seven 16-bit code values using the Unicode NUL character (0x0000). Unicode character data shall conform to the Unicode Standard, Version 3.0 [13].)

A major_channel_number field indicates the number of major channels associated with the vertical channel. (major_channel_number—A 10-bit number that represents the "major" channel number associated with the virtual channel being defined in this iteration of the "for" loop. Each virtual channel shall be associated with a major and a minor channel number. The major channel number, along with the minor channel number, act as the user's reference number for the virtual channel. The major_channel_number shall be between 1 and 99. The value of major_channel_number shall be set such that in no case is a major_channel_number/minor_channel_number pair duplicated within the TVCT. For major_channel_number assignments in the U.S., refer to Annex B.)

A minor_channel_number field indicates the number of minor channels associated with the virtual channel. (minor_channel_number—A 10-bit number in the range 0 to 999 that represents the "minor" or "sub"—channel number. This field, together with major_channel_number, functions as a two-part channel number, where minor_channel_number represents the second or right-hand part of the number. When the service_type is analog television, minor_channel_number shall be set to 0. Services whose service_type is ATSC_digital_television, ATSC_audio_only, or unassociated/small_screen_service shall use minor numbers between 1 and 99. The value of minor_channel_number shall be set such that in no case is a major_channel_number/minor_channel_number pair duplicated within the TVCT. For other types of services, such as data broadcasting, valid minor virtual channel numbers are between 1 and 999.)

A modulation_mode field indicates the modulation mode of a carrier associated with the virtual channel. (modulation_mode—An 8-bit unsigned integer number that indicates the modulation mode for the transmitted carrier associated with this virtual channel. Values of modulation_mode shall be as defined in Table 6.5. For digital signals, the standard values for modulation mode (values below 0x80) indicate transport framing structure, channel coding, interleaving, channel modulation, forward error correction, symbol rate, and other transmission-related parameters, by means of a reference to an appropriate standard. The modulation_mode field shall be disregarded for inactive channels.)

A carrier_frequency field is a field for identifying the carrier frequency. (carrier_frequency—The recommended value for these 32 bits is zero. Use of this field to identify carrier frequency is allowed, but is deprecated.)

A channel_TSID field indicates an MPEG-2 TS ID associated with the TS carrying the MPEG-2 program referenced by this virtual channel. (channel_TSID—A 16-bit unsigned integer field in the range 0x0000 to 0xFFFF that represents the MPEG-2 Transport Stream ID associated with the Transport Stream carrying the MPEG-2 program referenced by this virtual channel8. For inactive channels, channel_TSID shall represent the ID of the Transport Stream that will carry the service when it becomes active. The receiver is expected to use the channel-TSID to verify that any received Transport Stream is actually the desired multiplex. For analog channels (service_type 0x01), channel_TSID shall indicate the value of the analog TSID included in the VBI of the NTSC signal. Refer to Annex D Section 9 for a discussion on use of the analog TSID.)

A program_number field indicates an integer number that associates this virtual channel being defined here with the PMT. (program_number—A 16-bit unsigned integer number that associates the virtual channel being defined here with the MPEG-2 PROGRAM ASSOCIATION and TS PROGRAM MAP tables. For virtual channels representing analog services, a value of 0xFFFF shall be specified for program_number. For inactive channels (those not currently present in the Transport Stream), program_number shall be set to zero. This number shall not be interpreted as pointing to a Program Map Table entry.)

An ETM_location field indicates the existence and location of the ETM. (ETM_location—This 2-bit field specifies the existence and the location of an Extended Text Message (ETM) and shall be as defined in Table 6.6.)

An access_controlled field may indicate an event associated with the access-controlled virtual channel (access_controlled—A 1-bit Boolean flag that indicates, when set, that the events associated with this virtual channel may be access controlled. When the flag is set to "0", event access is not restricted.)

A hidden field may indicate the case in which the virtual channel is not accessed by the user by direct entry of the virtual channel number. (hidden—A 1-bit Boolean flag that indicates, when set, that the virtual channel is not accessed by the user by direct entry of the virtual channel number. Hidden virtual channels are skipped when the user is channel surfing, and appear as if undefined, if accessed by direct channel entry. Typical applications for hidden channels are test signals and NVOD services. Whether a hidden channel and its events may appear in EPG displays depends on the state of the hide_guide bit.)

A hide_guide field may indicate whether the virtual channel and the event thereof may be displayed in EPG. (hide_guide—A Boolean flag that indicates, when set to "0" for a hidden channel, that the virtual channel and its events may appear in the EPG displays. This bit shall be ignored for channels which do not have the hidden bit set, so that non-hidden channels and their events may always be included in EPG displays regardless of the state of the hide_guide bit. Typical applications for hidden channels with the hide_guide bit set to "1" are test signals and services accessible through application_level pointers.)

A service_type field indicates a service type identifier. (service_type—This 6-bit field shall carry the Service Type identifier. Service Type and the associated service_type field are defined in A/53 Part 1 [1] to identify the type of service carried in this virtual channel. Value 0x00 shall be reserved. Values 0x01 shall represent analog television programming. Other values are defined in A/53 Part 3 [3], and other ATSC Standards may define other Service Types9.)

A source_id field is an identification number for identifying a program source associated with the virtual channel. (source_id—A 16-bit unsigned integer number that identifies the programming source associated with the virtual channel. In this context, a source is one specific source of video, text, data, or audio programming. Source ID value zero is reserved. Source ID values in the range 0x0001 to 0x0FFF shall be unique within the Transport Stream that carries the VCT, while values 0x1000 to 0xFFFF shall be unique at the regional level. Values for source_ids 0x1000 and above shall be issued and administered by a Registration Authority designated by the ATSC.)

A descriptors_length field indicates the length of the following descriptors. (descriptors_length—Total length (in bytes) of the descriptors for this virtual channel that follows.)

Descriptors may be included in descriptor( ). (descriptor( )—zero or more descriptors, as appropriate, may be included.)

When a video service is transmitted according to the embodiments of the present invention, the service_type field may have a field value (e.g., 0x10) indicating a parameterized service (0x07), an extended parameterized service (0x09) or a scalable UHDTV service.

The UHD_program_type_descriptor shown in FIG. 11 and the UHD_composition_descriptor shown in FIG. 13 may be located at the descriptor location.

Next, the syntax of video data when video data is transmitted according to the embodiment of the present invention will be described.

FIG. 25 is a diagram showing the syntax of payload of an SEI area of video data according to embodiments of the present invention.

In SEI payload, if payloadType is set to a specific value (in this example, 52), as shown, information indicating that video data is a service having a scalable bit depth (UHDTV_scalable_bit_depth_service_info (payloadSize)) may be included. In particular, this signaling information indicates signaling information associated with the bit depth according to scalable coding.

An embodiment in which the decoder of the receiver parses video data according to the syntax will now be described.

When the decoder decodes the video data, UHD_scalable_bit_depth_service_info( ) which is signaling information, is obtained from SEI RBSP (raw byte sequence payload) of the video element stream.

The receiver parses the AVC or HEVC NAL unit. In addition, if the nal_unit_type value corresponds to SEI data and payloadType of the SEI data is 52, information according to the syntax of UHDTV_scalable_bit_depth_service_info SEI message may be obtained.

The syntax of the SEI payload may include information on a scalable bit_depth service for a video stream.

Accordingly, the receiver may decode video according to stream composition information supported by the receiver, such as 8-bit HD, 8-bit UHD or 10-bit UHD, based on this information and display video.

Figure 26:
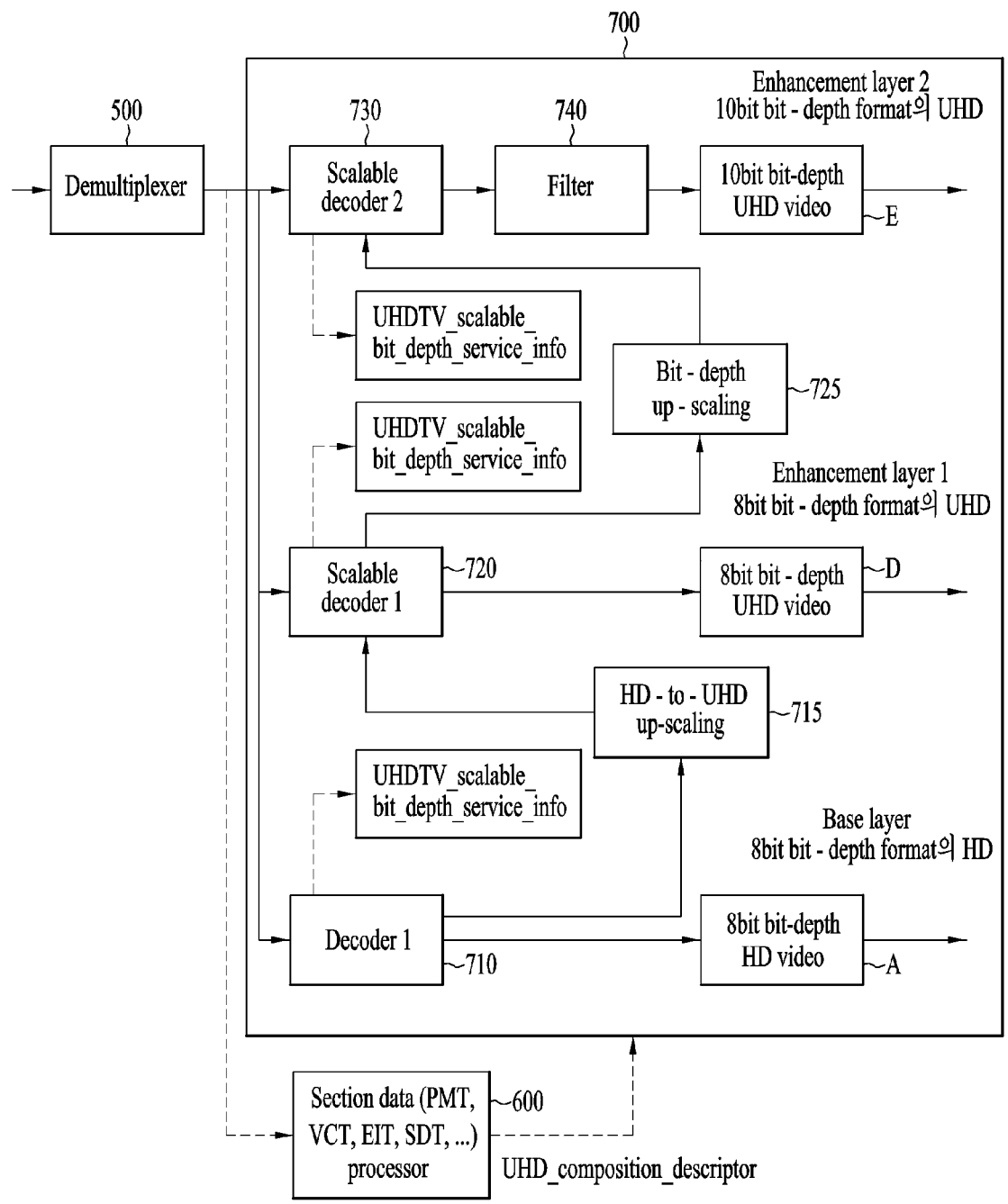
FIG. 26 is a diagram showing an embodiment of a signal reception apparatus according to the present invention.

FIG. 26 is a diagram showing an embodiment of a signal reception apparatus according to the present invention.

The signal reception apparatus may include a demultiplexer 500, a signaling information decoder 600 and a video decoder 700.

The demultiplexer 500 may demultiplex the video streams and signaling information according to the embodiment of the present invention. For example, the video streams may include the streams shown in FIG. 7.

The signaling information processor 600 may decode the signaling information shown in FIGS. 11 to 25.

The signaling information includes metadata capable of identifying whether video data is video which may be displayed according to a compatible bit depth.

The video decoder 700 may identify whether video data is video which may be displayed according to a compatible bit depth based on the signaling information.

The video decoder 700 may include a first decoder 710, may include a first decoder 710 and a second decoder 720 or may include a first decoder 710, a second decoder 720 and a third decoder 730, according to performance of the receiver.

The first decoder 710 may receive a stream carrying base layer data based on metadata of the signaling information, decode the base layer data and output 8-bit HD video A. In this case, the first decoder 710 may obtain bit depth information (UHDTV_scalable_bit_depth_service_info) shown in FIG. 25 from the video stream.

A first upscaler 715 may upscale 8-bit HD video data which is the base layer data into UHD video and output the UHD video.

A second decoder 720 may decode the 8-bit HD video data received from the first upscaler 715 and first enhancement layer data according to scalable coding based on the metadata of the signaling information and output 8-bit UHD video data D.

Similarly, the second decoder 720 may obtain the bit depth information (UHDTV_scalable_bit_depth_service_info) shown in FIG. 25 from the video stream.

A second upscaler 725 may upscale the bit depth of the 8-bit UHD video data D and output the upscaled data.

The third decoder 730 may decode the video data obtained by upscaling the 8-bit UHD video and second enhancement layer data according to scalable coding and output 10-bit UHD video data E.

A filter 740 may perform filtering such that the video data according to upscaling is more naturally displayed.

Accordingly, using composition information of video which may be displayed according to a compatible bit depth, metadata indicating the video composition information and scalable encoding/decoding, video having different bit depths may be displayed according to performance of the receiver.

Figure 27:
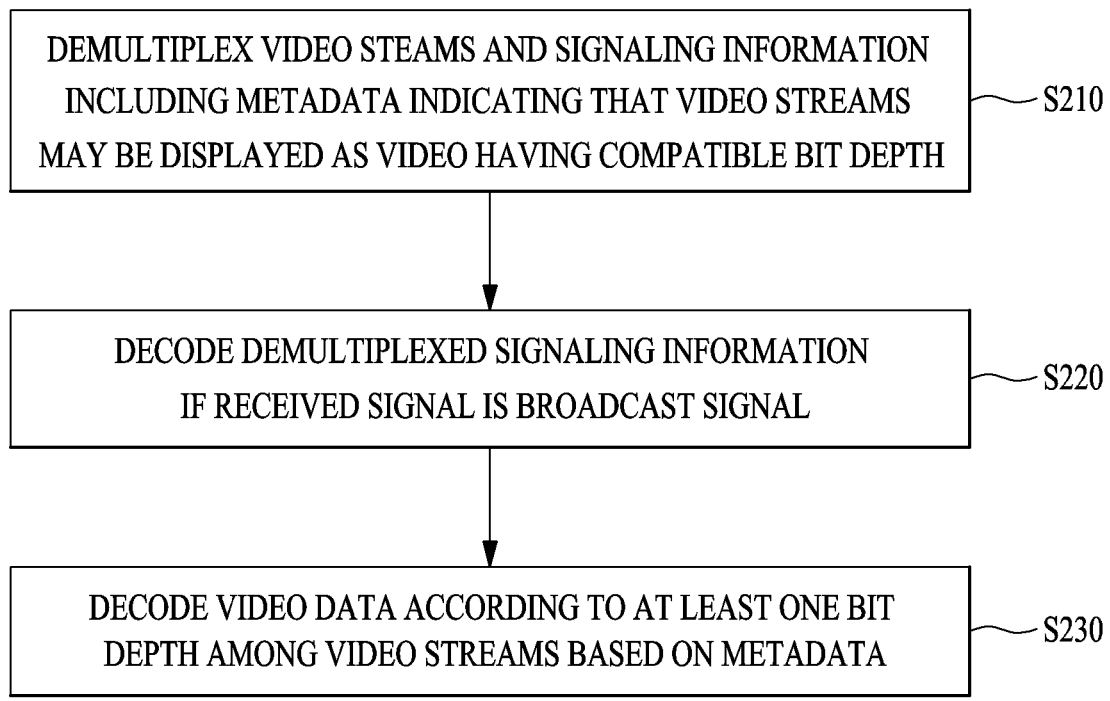
FIG. 27 is a diagram showing an embodiment of a signal reception method according to the present invention.

FIG. 27 is a diagram showing an embodiment of a signal reception method according to the present invention.

One embodiment of the signal reception method according to the present invention includes demultiplexing video streams and signaling information including metadata indicating that the video streams may be displayed as video having compatible bit depths (S210). The signaling information may be multiplexed only when the received video is a broadcast signal. The video streams carry video data which may be displayed in a color gamut of any one of a plurality of bit depths.

The composition of the received video streams is shown in FIG. 7. For example, the 10-bit UHD video data E may include 8-bit UHD video D, second residual data b which is a difference between 8-bit UHD video and 10-bit UHD video, and metadata M. The 8-bit UHD video D may include 8-bit HD video A and first residual data a which is a difference between 8-bit UHD video D and 8-bit HD video A. Although 10 bits and 8 bits are shown as being used as the bit depth in this case, transmission or reception is possible even when the bit depth is changed.

If the received signal is a broadcast signal, the signaling information shown in FIGS. 11 to 24 may be demultiplexed independently of video data.

If the received signal is a broadcast signal, the demultiplexed signaling information may be decoded (S220). If the received signal is not a broadcast signal, step S220 is omitted and the signaling information including metadata (shown in FIG. 25) in the video data may be decoded and used in the following video data decoding step.

Based on the metadata, video data according to at least one bit depth among the video streams is decoded (S230).

For example, as shown in FIG. 10 or 26, when video data is decoded according to performance of the receiver or metadata, it is possible to display video having different bit depths and resolutions, such as 10-bit UHD video, 8-bit UHD video or 8-bit HD video.

Figure 28:
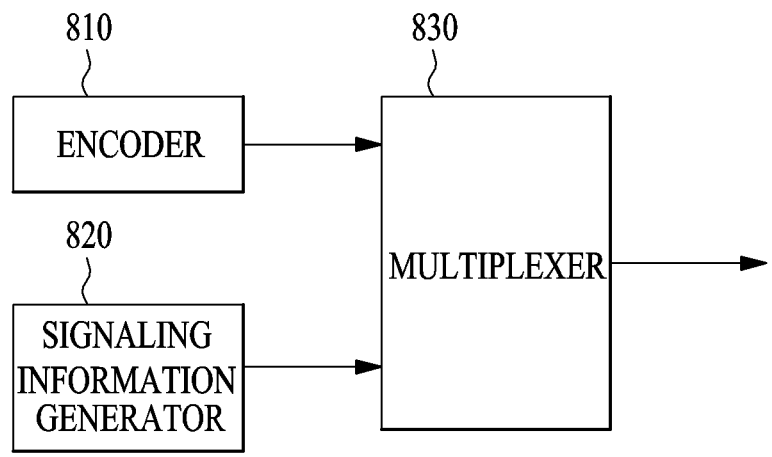
FIG. 28 is a diagram showing an example of a signal transmission apparatus according to an embodiment of the present invention.

FIG. 28 is a diagram showing an example of a signal transmission apparatus according to an embodiment of the present invention.

One embodiment of the signal transmission apparatus may include an encoder 810, a signaling information generator 820 and a multiplexer 830.

The encoder 810 encodes video data. The video data encoded by the encoder 810 may include video data having a compatible bit depth and metadata indicating the composition of the video data. A method of encoding the video data having the compatible bit depth is shown in FIGS. 8 and 9 and the metadata is shown in FIG. 25.

For example, if the encoded video data is based on the information shown in FIG. 7, the 10-bit UHD video data E may include 8-bit UHD video D, second residual data b which is a difference between 8-bit UI-ID video and 10-bit UHD video, and metadata M. The 8-bit UHD video D may include 8-bit HD video A and first residual data a which is a difference between 8-bit UHD video D and 8-HD video A. Although 10 bits and 8 bits are shown as being used as the bit depth in this case, transmission or reception is possible even when the bit depth is changed.

If the transmitted signal is a broadcast signal, one embodiment of the signal transmission apparatus includes the signaling information generator 820 independently of the encoder 810.

The signaling information generator 820 generates metadata enabling display of the video data encoded by the encoder 810 with a compatible bit depth. Example of the signaling information independently of the video data is shown in FIGS. 11 to 24.

The multiplexer 830 may multiplex the encoded video data and the signaling information and output the multiplexed video data and signaling information. If the transmitted data is not a broadcast signal, the signaling information generator 820 for generating the signaling information multiplexed with the video data is omitted and the multiplexer 830 multiplexes the video data including the metadata within the video data area encoded by the encoder 810 with other data (e.g., audio data) and outputs the multiplexed data.

According to one embodiment of the signal transmission apparatus, one example of the signal transmission apparatus encodes video data such that video data having different bit depths is displayed according to performance of the receiver and metadata, and transmits the encoded video data.

Figure 29:
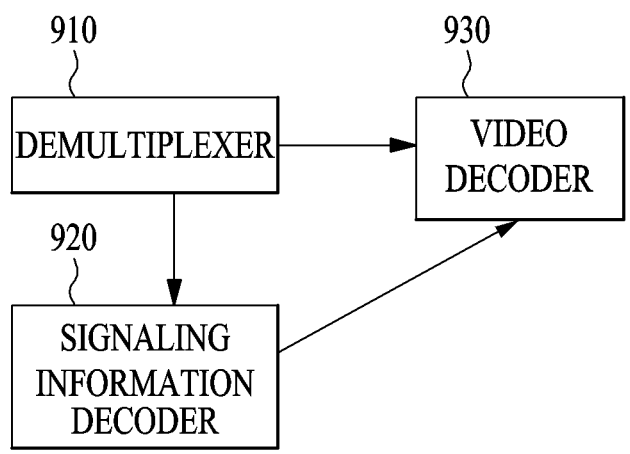
FIG. 29 is a diagram showing an example of a signal reception apparatus according to an embodiment of the present invention.

FIG. 29 is a diagram showing an example of a signal reception apparatus according to an embodiment of the present invention One embodiment of the signal reception apparatus may include a demultiplexer 910, a signaling information decoder 920 and a video decoder 930.

The demultiplexer 910 demultiplexes the video streams and signaling information. Only when the received signal is a broadcast signal, the signaling information is demultiplexed. The structure of the demultiplexed video streams is shown in FIG. 7. As shown in FIG. 7, the metadata of the video data may be included in the demultiplexed video streams and the syntax thereof was described in detail above with reference to FIG. 25.

For example, the 10-bit UHD video data E may include 8-bit UHD video D, second residual data b which is a difference between 8-bit UHD video and 10-bit UHD video, and metadata M. The 8-bit UHD video D may include 8-bit HD video A and first residual data a which is a difference between 8-bit UHD video D and 8-bit HD video A. Although 10 bits and 8 bits are shown as being used as the bit depth in this case, transmission or reception is possible even when the bit depth is changed.

If the received video stream is a broadcast signal, the demultiplexer 910 demultiplexes the signaling information of FIGS. 11 to 24 transmitted independently of the video data and, if the received video stream is not a broadcast signal, the composition of the video data stream may be confirmed using the metadata shown in FIG. 7.

If the received signal is a broadcast signal, the signaling information decoder decodes the demultiplexed signaling information. The demultiplexer signaling information may include information shown in FIGS. 11 to 24 and the information shown in the above-described figures may be decoded according to the embodiment. If the received signal is a not broadcast signal, the signaling information decoder 920 is omitted and information obtained by decoding the signaling information within the video data in the following video data decoding step may be used.

The video decoder 930 decodes the video data according to the metadata which is the signaling information decoded by the signaling information decoder 920 or within the video data area according to the embodiment. A detailed example of the video decoder 930 was described above with reference to FIG. 10 or 26.

Accordingly, according to one embodiment of the signal reception apparatus, it is possible to output video having different bit depths according to performance of the receiver using metadata.

MODE FOR INVENTION

Various embodiments have been described in the best mode for carrying out the invention.

INDUSTRIAL APPLICABILITY

The present invention is applicable to broadcast and video signal processing fields.

The invention claimed is:

1. A signal transmission method comprising:
encoding ultra high definition (UHD) video data in a color gamut of a m-bit depth,
wherein the encoded UHD video data includes:
 a first base layer data having HD video data in a color gamut of an n-bit depth,
 a first enhancement layer data having a first residual data for UHD video data in the color gamut of the n-bit depth, where n is a natural number, and
 a second enhancement layer data having a second residual data for the UHD video data in the color gamut of the m-bit depth, where m is a natural number, and m is greater than n;
generating signaling information,
wherein the signaling information includes program type information indicating compatibility of video service in bit depth and resolution, and composition metadata for the second enhancement layer data, and
wherein the composition metadata includes original UHD video bit depth information indicating a bit depth type of original UHD video data, difference bit depth information indicating a difference in bit depth between the original UHD video data and video data of the second enhancement layer data, and information on a scaling of a bit depth for the encoded UHD video data; and
multiplexing the encoded UHD video data and the generated signaling information and transmitting the multiplexed video data and signaling information.

2. The signal transmission method according to claim 1, wherein the signaling information includes information on a video resolution, a frame rate and a progressive scanning of the encoded UHD video data.

3. A signal reception method comprising:
demultiplexing video streams carrying ultra high definition (UHD) video data and signaling information,
wherein the video streams include:
 a first base layer data having HD video data in a color gamut of an n-bit depth,
 a first enhancement layer data having a first residual data for UHD video data in the color gamut of the n-bit depth, where n is a natural number, and
 a second enhancement layer data having a second residual data for UHD video data in the color gamut of the m-bit depth, where m is a natural number, and m is greater than n;
decoding the demultiplexed signaling information,
wherein the demultiplexed signaling information includes program type information indicating compatibility of video service in bit depth and resolution, and composition metadata for the second enhancement layer data, and wherein the composition metadata includes original UHD video bit depth information indicating a bit depth type of original UHD video data, difference bit depth information indicating a difference in bit depth between the original UHD video data and video data of the second enhancement layer data and information on a scaling of a bit depth for the UHD video data; and decoding the first base layer data or the UHD video data based on the signaling information.

4. The signal reception method according to claim 3, wherein the signaling information includes information on a video resolution, a frame rate and a progressive scanning of the UHD video data.

5. A signal transmission apparatus comprising:

an encoder configured to encode ultra high definition (UHD) video data in a color gamut of a m-bit depth, wherein the encoded UHD video data includes:

a first base layer data having HD video data in a color gamut of an n-bit depth, a first enhancement layer data having a first residual data for UHD video data in the color gamut of the n-bit depth, where n is a natural number, and a second enhancement layer data having a second residual data for UHD video data in the color gamut of the m-bit depth, where m is a natural number, and m is greater than n;

a signaling information generator configured to generate signaling information, wherein the signaling information includes program type information indicating compatibility of video service in bit depth and resolution, and composition metadata for the second enhancement layer data, and wherein the composition metadata includes original UHD video bit depth information indicating a bit depth type of original UHD video data, difference bit depth information indicating a difference in bit depth between the original UHD video data and video data of the second enhancement layer data and information on a scaling of a bit depth for the encoded UHD video data; and a multiplexer configured to multiplex the encoded UHD video data and the signaling information.

6. The signal transmission apparatus according to claim 5, wherein the signaling information includes information on a video resolution, a frame rate and a progressive scanning of the UHD video data.

7. A signal reception apparatus comprising:

a demultiplexer configured to demultiplex video streams carrying ultra high definition (UHD) video data and signaling information, wherein the video streams include:

a first base layer data having HD video data in a color gamut of an n-bit depth, a first enhancement layer data having a first residual data for UHD video data in the color gamut of the n-bit depth, where n is a natural number, and a second enhancement layer data having a second residual data for UHD video data in the color gamut of the m-bit depth, where m is a natural number, and m is greater than n;

a decoder configured to decode the demultiplexed signaling information, wherein the demultiplexed signaling information includes program type information indicating compatibility of video service in bit depth and resolution, and composition metadata for the second enhancement layer data, and wherein the composition metadata includes original UHD video bit depth information indicating a bit depth type of original UHD video data, difference bit depth information indicating a difference in bit depth between the original UHD video data and video data of the second enhancement layer data and information on a scaling of a bit depth for the UHD video data; and a video decoder configured to decode the first base layer of video data or the UHD video data based on the generated signaling information.

8. The signal reception apparatus according to claim 7, the signaling information includes information on a video resolution, a frame rate and a progressive scanning of the UHD video data.

* * * * *